(12) United States Patent
Welch et al.

(10) Patent No.: US 11,586,268 B2
(45) Date of Patent: *Feb. 21, 2023

(54) STOPPING SENSING STATE OF A SENSOR BASED ON POWER DECOUPLING AND DATA DECOUPLING

(71) Applicant: Amazon Technologies, Inc., Seattle, WA (US)

(72) Inventors: Gerald A. Welch, San Jose, CA (US); Zachary Lawrence Brand, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/849,378

(22) Filed: Apr. 15, 2020

(65) Prior Publication Data

US 2021/0325953 A1  Oct. 21, 2021

(51) Int. Cl.
*G06F 1/32* (2019.01)
*G06F 1/3206* (2019.01)

(52) U.S. Cl.
CPC ................... *G06F 1/3206* (2013.01)

(58) Field of Classification Search
CPC ...................................................... G06F 1/3206
See application file for complete search history.

(56) References Cited

U.S. PATENT DOCUMENTS

| | | |
|---|---|---|
| 10,878,315 B1 | 12/2020 | Whatmough |
| 2013/0222609 A1 | 8/2013 | Soffer |
| 2015/0248566 A1 | 9/2015 | Scott-Nash et al. |
| 2016/0255204 A1 | 9/2016 | Vashisht et al. |
| 2017/0245076 A1 | 8/2017 | Kusano et al. |
| 2017/0263254 A1 | 9/2017 | Dewan et al. |
| 2018/0048767 A1 | 2/2018 | Tinsman |
| 2018/0165472 A1 | 6/2018 | Adams et al. |
| 2020/0196141 A1 | 6/2020 | Baker et al. |
| 2021/0084406 A1 | 3/2021 | Fraize, Jr. et al. |

FOREIGN PATENT DOCUMENTS

EP   3410679   12/2018

OTHER PUBLICATIONS

"What Does Controller Mean?", Technopedia, retrieved from the Internet at <https://www.techopedia.com/definition/2359/controller-aspnet#:~:text=A%20controller%20is%20a%20program,expected%20user%20actions%20and%20results.> (Year: 2012).*

(Continued)

*Primary Examiner* — Stefan Stoynov

(74) *Attorney, Agent, or Firm* — Kilpatrick Townsend & Stockton LLP

(57) ABSTRACT

Techniques are described for controlling a sensing state of a device. For example, a controller of the device receives input data indicating a request to disable a sensor of the device. The controller determines that the sensor is not disabled and is to enter a mute state based on the input data. Accordingly, controller causes the sensor to be decoupled from a power source via a power switch, causes the sensor to be decoupled from a processor of the device via a data switch, and causes outputting of an indication of the mute state by a user interface of the device.

20 Claims, 15 Drawing Sheets

(56) References Cited

OTHER PUBLICATIONS

"Model-view-controller" Wikipedia, retrieved from the Internet at <https://en.wikipedia.org/wiki/Model%E2%80%93view%E2%80%93controller> (Year: 2012).*

"I2S Bus Specification," Philips Semiconductors, Feb. 1986, Revised Jun. 5, 1996, 7 pages.

U.S. Appl. No. 16/870,111, Non-Final Office Action, dated Mar. 3, 2021, 12 pages.

"Amazon Echo", Available Online at: https://en.wikipedia.org/w/index.php?title=Amazon_Echo&oldid=884428761, Amazon Echo—Wikipedia, Feb. 21, 2019, 15 pages.

WO Application No. PCT/US2021/025517, "International Search Report and Written Opinion," dated Jul. 22, 2021, 26 pages.

U.S. Appl. No. 16/870,111, Final Office Action, dated Aug. 11, 2021, 15 pages.

U.S. Appl. No. 16/870,111, Non-Final Office Action, dated Oct. 29, 2020, 13 pages.

U.S. Appl. No. 16/870,111, Advisory Action, dated Oct. 20, 2021, 5 pages.

U.S. Appl. No. 16/870,111, Notice of Allowance, dated Nov. 3, 2021, 12 pages.

U.S. Appl. No. 17/591,449, "Non-Final Office Action," dated Dec. 12, 2022, 19 pages.

* cited by examiner

STOPPING SENSING STATE OF A SENSOR BASED ON POWER DECOUPLING AND DATA DECOUPLING

BACKGROUND

A computing device can have various modalities for user interactions. Depending on the modalities, different types of user inputs can be received and processed to support different types of functionalities of the computing device. For example, a smart speaker can include a microphone. The microphone can detect and send natural language utterance of a user to an audio processor of the computing device for control of, for instance, a volume of the smart speaker or other functionalities thereof. In another example, the smart speaker can also include a camera and a display. In a two-way communication session, the camera can generate and send a video of the user to another remote device. Further, the display can present video received from the remote device. The smart speaker and, similarly, other types of computing devices can include buttons to enable and disable the different modalities.

BRIEF DESCRIPTION OF THE DRAWINGS

Various embodiments in accordance with the present disclosure will be described with reference to the drawings, in which.

DETAILED DESCRIPTION

Figure 1:
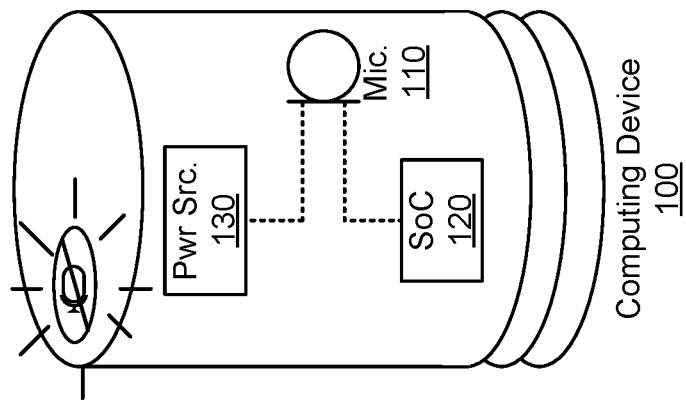
FIG. 1 illustrates an example of a computing device that includes a button for controlling a sensing state of a sensor of the computing device, according to embodiments of the present disclosure.
Figure 1:
Figure 1:
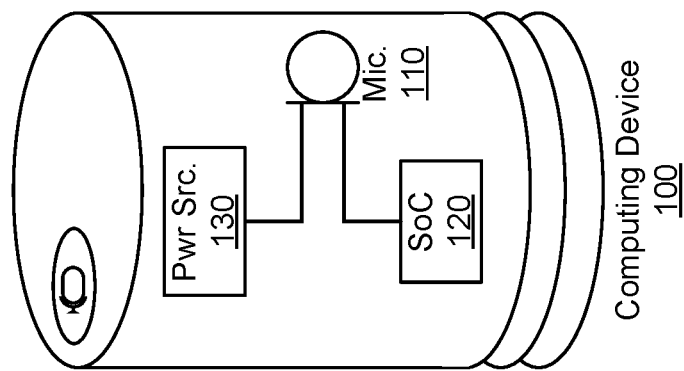

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, controlling one or more sensing states of one or more sensors of a computing device based on a decoupling of each sensor from a power source and from a data line to a processor of the computing device. In an example, the decoupling is performed by a controller of the computing device, where the controller is separate from and independent of the processor to achieve a higher fidelity and more security in the controlling of the one or more sensing state(s). In particular, the computing device further includes a button operable to request a stop to the one or more sensing states (e.g., each sensor would stop sensing the applicable data), where this request is received by the controller as a request signal. Generally, in the sensing state, the sensor is enabled and is capable of sensing and generating sensed data. When the sensing state is stopped, the sensor is in a mute state. In the mute state, the sensor is disabled and no longer capable of sensing and/or generating sensed data. As described herein below, different techniques are possible to disable the sensor. For example, the sensor can be disabled by decoupling the sensor from the power source and/or decoupling the sensor from the processor. The computing device also includes a user interface that indicates the one or more sensing states and a set of switches that are controllable by the controller. Upon a signal from the controller in response to the request signal from the button, the user interface presents a notification about the mute state. Upon one or more signals from the controller also in response to the request signal from the button, the set of switches opens a power line between the power source and each sensor, thereby powering off the one or more sensors. Additionally or alternatively, the set of switches outputs one or more override signals on one or more data lines between the one or more sensors and the processor, thereby blanking any input data of the one or more sensors to the processor. Depending on latency requirements to terminate execution of computer-readable instructions on the processor, the controller can send a notification signal to the processor about the request, delay the one or more signals to the set of switches by a time delay that is long enough to meet the latency requirement, and send a second notification signal to the processor upon the actual stop to the one or more sensing states. In addition, the controller can receive a voltage level signal from the user interface. Upon detecting a failure at the user interface based on the voltage level signal, the controller can send the one or more signals to the set of switches and the notification signals to the processor, even when the request signal has not been received from the button.

To illustrate, consider an example of a smart speaker that includes a microphone and a mute button operable to mute and unmute the microphone. In this example, the smart speaker also includes a mute controller, a power switch, a data switch, a light source, and system on a chip (SoC). The light source indicates whether the microphone is muted or not. The SoC provides various audio processing functionalities. Upon a push of the mute button, the mute controller detects the push and determines that the microphone is currently in the sensing state and is to enter a mute state. Accordingly, the mute controller controls the power switch to sever a connection between a power source and the microphone (e.g., by creating an open circuit, such as by causing an open in a power line between the power source and the microphone), thereby powering off the microphone. The mute controller also controls the data switch to zero any audio serial data that is otherwise input to the SoC. The mute controller also controls the light source to emit light indicating that the microphone has been muted.

In this example, the smart speaker further includes a camera, a second power switch coupled to the camera, and a second data switch coupled to the camera. The mute button is also operable to disable and enable the camera. Here also, based on determining that the operational state is the sensing state and should be changed to the mute state, the mute controller controls the second power switch to sever a connection between the power source and the camera, thereby powering off the camera. The mute controller also controls the second data switch to output a camera disabled status to the SoC. Because a graceful shutdown of program code of the camera cannot be immediate and can necessitate a certain length of time (e.g., five-hundred milliseconds), the mute controller delays the controls of the second power switch and the second data switch by a longer time interval (e.g., one second), sends a notification to the SoC about the mute request to trigger the graceful shutdown, and sends a second notification to the SoC about the actual shutdown of the camera at the end of the time interval.

Furthermore, the mute controller receives a voltage level at the light source (e.g., at a cathode of an light emitting diode (LED) of the light source). When the mute button is not pushed and the SoC indicates that the smart speaker is in the sensing state, the mute controller continuously compares the voltage level to a voltage threshold (e.g., the voltage threshold set to a minimum voltage value at which light emitted by the LED is visible to a human eye). Based on this comparison, the mute controller determines whether a failure in the light source exists (e.g., when the voltage level exceeds the voltage threshold, corresponding to light being emitted by the LED when this light emission should not be occurring). If the failure is detected, the mute controller controls the above power switches and data switches to power off the microphone and the camera and blank any audio data and video data such that each of the microphone and camera enters the mute state.

Embodiments of the present disclosure provide technological advantages over existing systems to control the sensing states of sensors. In particular, by using a controller and set of switches that are separate from a processor, security of the computing device can be improved. In particular, the processor is prevented from having controls over the stopping and resuming of the sensing states. Hence, even when the processor is compromised (e.g., its software being hacked or includes a bug), the compromise does not affect the stopping and resuming of the sensing states. The fidelity of the stopping and resuming of the sensing states can also be improved by implementing a controller that outputs multiple redundant signals and delays such signals to allow a graceful shutdown of relevant program code executing on the processor In addition, the controller can have a universal design and, hence, can be implemented in different types of devices to support a wide range of sensors. The support can be extended to a sensor of a particular type by indirectly coupling the sensor with the controller via set of switches. These and other technological improvements are further described in connection with the next figures.

In the interest of clarity of explanation, various embodiments of the present disclosure are described in connection with a computing device that includes a microphone and/or a camera. However, the embodiments are not limited as such and apply to controlling the sensing state (e.g., stopping and resuming the sensing state) of any type of sensors including, for instance, motion sensors, temperature sensors, Lidar sensors, and the like. Various embodiments of the present disclosure are also described in connection with an SoC of the computing device. However, the embodiments are not limited as such and apply to any type of processor of the computing device where the processor is coupled with the mute controller and one or more of the sensors controlled by the mute controller. In addition to an SoC, the processor can be any of a central processing unit (CPU), a microcontroller, a field programmable gate array (FPGA), or other type of a processing device.

FIG. 1 illustrates an example of a computing device 100 that includes a button for controlling a sensing state of a sensor of the computing device, according to embodiments of the present disclosure. In this illustrative example, the sensor is a microphone 110 (although other types of the sensor are equivalently possible) and the button is a mute button to mute the microphone 110. The muting includes powering off the microphone 110 and blanking any audio data that would have otherwise been output by the microphone 110.

The computing device 100 also includes a SoC 120 and a power source 130, among other components. The SoC 120 can be an integrated circuit, such as a microchip, that integrates various computing components that provide some or all the functionalities of the computing device 110. These components can include a central processing unit (CPU), a memory and other data storages, analog to digital converters (ADCs), digital to analog converters (DCAs) network interface cards, and input/output ports. This and other potential hardware circuitry and/or software executed on such hardware circuitry provide the functionalities. For instance, the computing device 100 can be a smart speaker. In this case, the functionalities include wakeword detection, audio processing, communications with a backend server over a local area network, transmission and receipt of audio data, playing audio, and the like.

The SoC 120 and the microphone 110 can be coupled over a data line. The data line can carry audio data (digital or analog) from the microphone 110 to the SoC 120 for further processing (e.g., to detect a wakeword, to transmit the audio data in a communications session with a remote computing device, and the like). For instance, the data line can be an I2S bus carrying I2S serial data, where the specification of the I2S bus is defined in the "I2S bus specification," Philips Semiconductors, Jun. 5, 1996, the content of which is incorporated by reference herein in its entirety.

The power source 130 provides power to various components of the computing device 100. The power can be direct current (DC) power and the power source 130 and/or other components of the computing device 100 can include voltage converters, step-up transformers, step-down transformers, and the like to supply the proper powers to the components of the computing device 100. The power can be supplied over different power lines, such as voltage rails, including a power line between the power source 130 and the microphone 110, and a power line between the power source 130 and the SoC 120. For instance, the power line to the microphone 110 delivers 3.3 volts DC (VDC). A same or a different voltage can be delivered to the SoC 120. The power source 130 can include rechargeable or disposable batteries and/or a receptacle to receive power from an external source, such as from a power outlet.

The microphone 110 can have an operational state that varies between a sensing state and a mute state. The toggle between the states can be initiated via the mute button and controlled via a mute controller coupled with a set of switches configured as gating peripherals, as further illustrated in the next figures. In the sensing state, the microphone 110 detects audio, including natural language utterances, white noise, background noise such as music, and the like, generates audio data based on the detection, and sends the audio data to the SoC 120. In the mute state, the microphone 110 is not to detect any audio and no audio data is to be sent to the SoC 120. Embodiments of the present disclosure prevent the audio detection and audio data transmission by powering off the microphone 110 and/or blanking the output of the microphone 110 to the SoC 120. Blanking includes zeroing the audio data (e.g., setting all data bits to have a zero value in case of digital audio data (e.g., all data bits become "0" bits), setting the voltage level to zero volts of audio data in case of analog audio data).

As illustrated in FIG. 1, prior to activation of the mute button (shown as a button activation 150), the microphone 110 is in the sensing state. In an example, the mute button is a physical button that can be activated in one or more ways. For instance, the physical button is any of a push button, a toggle button, or a pull button and its activation can be a push, a toggle, or a pull, respectively. The mute button can also be a software button displayed on a GUI based on an execution of a button application. In this case, the button application may not be executed on the SoC 120, and the activation can be via a click, a touch, or a swipe. Upon deactivation, the microphone 110 is in the sensing state. In the sensing state, the microphone 110 is coupled with the power source 130 over the power line and, thus, is powered on as illustrated with the solid line between the microphone 110 and the power source 130. Also in the sensing state, the microphone 110 is coupled with the SoC 120 over the data line and, thus, outputs audio data to the SoC 120, as illustrated with the solid line between the microphone 110 and the SoC 120.

Upon the button activation 150, the microphone 110 is in the mute state. In the mute state, the microphone 110 is decoupled from the power source 130 as illustrated with the dotted line between the microphone 110 and the power source 130 (e.g., an open is created in the power line). Also in the mute state, the output of the microphone 110 to the SoC 120 is blanked, as illustrated with the dotted line between the microphone 110 and the SoC 120.

To unmute the microphone 110 (e.g., exit the mute state and re-enter the sensing state), the mute button can be selected again (e.g., deactivated). In a further example, the transition from the sensing state to the mute state based on the button activation 150 and/or the transition from the mute state to the sensing state based on the mute button deactivation can be controlled by the mute controller to prevent any controls by the SoC 120 over the transitions. For instance, the SoC 120 (or a program code being executed thereon) is prevented from transitioning the microphone 110 out of the mute state 110 once the button selection 150 occurs. In this way, any compromise to software of the SoC 120 cannot affect this transition.

To indicate the mute state, the computing device 100 includes a light source, as further shown in the next figures. The light source includes, among other components, light elements such as LEDs. Upon the button selection 150, the light elements are controlled (e.g., by the mute controller, as further described in connection with the next figures) to emit light as a visual indicator of the mute state. The light elements can be disposed within, around, and/or in vicinity of the mute button, can be located at a particular location in the computing device 100 (e.g., at a top surface), and/or can be distributed along one or more surfaces (e.g., as an external ring around the top surface). The light source is an example of a user interface that indicates the mute state. Of course, other types of user interfaces are possible including, for instance, an audio interface (e.g., a speaker that plays a particular chime to indicate the mute state) and/or a graphical user interface (GUI) that displays a notification to indicate the mute state. In the sensing state, the light elements may not emit light (and, similarly, other types of user interfaces may not present the indication about the mute state).

Figure 2:
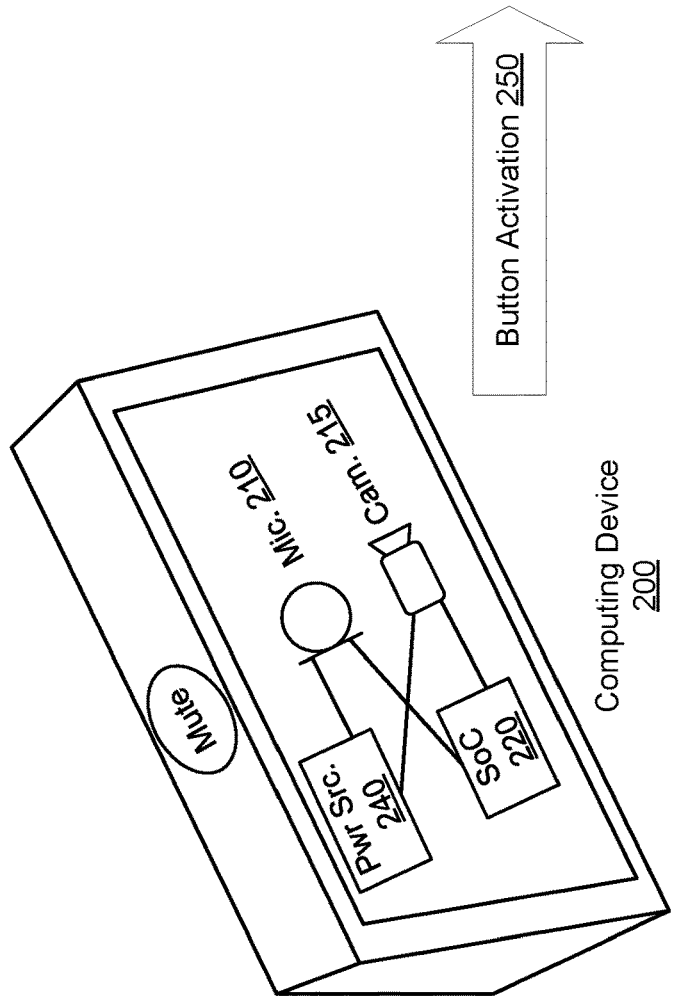
FIG. 2 illustrates an example of a computing device that includes a button for controlling sensing states of multiple sensors of the computing device, according to embodiments of the present disclosure.
Figure 2:
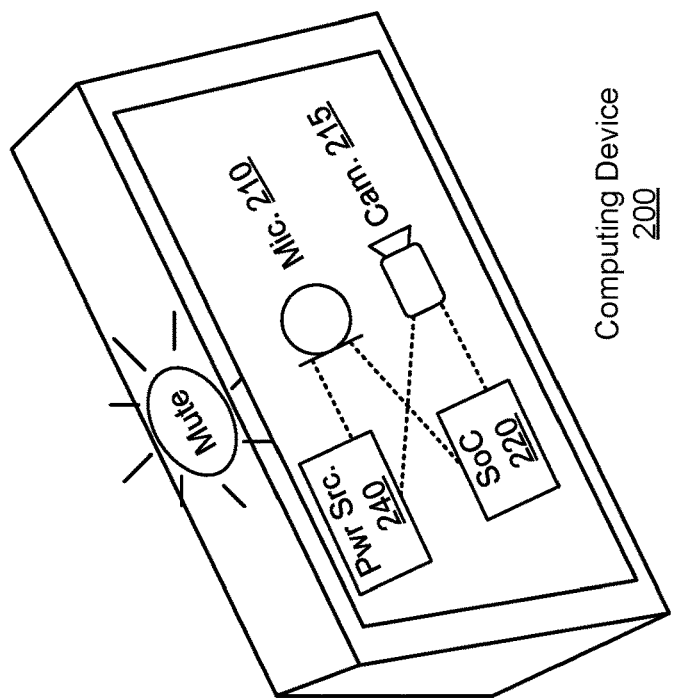

FIG. 2 illustrates an example of a computing device 200 that includes a button for controlling sensing states of multiple sensors of the computing device 200, according to embodiments of the present disclosure. In this illustrative example, the sensors include two sensors, although other types of the sensors are equivalently possible. A first sensor is a microphone 210. The second sensor is a camera 215 (e.g., a set of CMOS sensors and relevant circuitry). The button is a mute button to mute both the microphone 210 and the camera 215 upon one selection of the button. The muting includes powering off the microphone 210 and the camera 215 and blanking any audio data and video data that would have otherwise been output by the microphone 210 and the camera 215. The microphone 210 and the camera 215 can support, for instance, an audio and video communication session with a remote device, where audio data and video data can be transmitted to the remote device and where audio data and video data can be received from the remote device and presented at the computing device 200 (e.g., via a speaker and a display of the computing device 200).

The computing device 200 also includes a SoC 220 and a power source 240, among other components. The SoC 220 can be an integrated circuit, such as a microchip, that integrates various computing components that provide some or all the functionalities of the computing device 210, including the audio data and video data processing, transmission, reception, and presentation.

The SoC 220 and the microphone 210 can be coupled over a first data line. The first data line can carry audio data (digital or analog) from the microphone 210 to the SoC 220 for further processing (e.g., to detect a wakeword, to transmit audio data in a communications session with a remote computing device, and the like). For instance, the first data line can be an I2S bus carrying I2S serial data. The SoC 220 and the camera 215 can also be coupled over a second data line. The second data line can carry video data (digital or analog) from the camera 215 to the SoC 220 for further processing (e.g., to detect an object presence in the video data, to transmit the video data in a communications session with the remote computing device, and the like). For instance, the second data line can be a video interconnect bus that supports different compression formats including MPEG-4.

The power source 230 provides power to various components of the computing device 200. The power can be DC power and the power source 240 and/or other components of the computing device 200 can include voltage converters, step-up transformers, step-down transformers, and the like to supply the proper powers to the components of the computing device 200. The power can be supplied over different power lines, such as voltage rails, including a first power line between the power source 240 and the microphone 210, a second power line between the power source 240 and the camera 215, and a power line between the power source 240 and the SoC 220. For instance, the first power line to the microphone 210 delivers 3.3 VDC. The second power line to the camera 215 delivers 5 VDC. The power source 240 can include rechargeable or disposable batteries and/or a receptacle to receive power from an external source, such as from a power outlet.

The microphone 210 can have an operational state that varies between a sensing state and a mute state. In the sensing state, the microphone 210 detects audio, including natural language utterances, white noise, background noise such as music, and the like, generates audio data based on the detection, and sends the audio data to the SoC 220. In the mute state, the microphone 210 is not to detect any audio and no audio data is to be sent to the SoC 220. Similarly, the camera 215 can have an operational state that varies between a sensing state and a mute state. In the sensing state, the camera 215 detects video and sends the resulting video data to the SoC 220. In the mute state, the camera 215 is not to detect any video and no video data is to be sent to the SoC 220.

In an example, the operational states of the microphone 210 and the camera 215 can be synchronized. In other words, while the microphone 210 is in the sensing state, the camera 215 is also in the sensing state, and vice versa. While the microphone 210 is in the mute state, the camera 215 is also in the mute state, and vice versa. This synchronization can be implemented by using a single mute button to toggle between the states. In particular, upon an activation of the mute button (e.g., illustrated in FIG. 2 as a button activation 250), the microphone 210 and the camera 215 transition to the respective mute states. Upon deactivation of the mute button, the microphone 210 and the camera 215 transition to the respective sensing states. The synchronization of the operational states of the microphone 210 and the camera 215 can be referred to herein by a sensing state and a mute state of the computing device 200. In particular, in the sensing state of the computing device 200, the microphone 210 is in its sensing state and the camera 215 is in its sensing state. In the mute state of the computing device, the microphone 210 is in its mute state and the camera 215 is in its mute state.

The mute button can be implemented similarly to the button described in connection with FIG. 1, where this button can be a physical button or a software button and can be activated for the mute state and deactivated for the sensing state. The toggle between the sensing state and the mute state of the computing device 200 can be initiated via the mute button and controlled via a mute controller coupled with sets of switches configured as gating peripherals, as further illustrated in the next figures.

While the microphone 210 is in the mute state, embodiments of the present disclosure prevent the audio detection and audio data transmission by powering off the microphone 210 and blanking the output of the microphone 210 to the SoC 220. Blanking includes zeroing the audio data (e.g., setting all data bits to have a zero value in case of digital audio data, setting the voltage level to zero volts of audio data in case of analog audio data). Similarly, while the camera 215 is in the mute state, the embodiments of the present disclosure prevent the video detection and video data transmission by powering off the camera 215 and blanking the output of the camera 215 to the SoC 220. This blanking includes, for instance, sending a camera disable signal (e.g., a camera disabled status) to the SoC 220 to disable the video processing at the SoC 220. Alternatively or additionally, blanking the output of the camera 215 includes zeroing the video data on each data line between the camera 215 and the SoC 220.

As illustrated in FIG. 2, prior to the button activation 250, the computing device 200 is in the sensing state, whereby the microphone 210 is in its sensing state and the camera 215 is in its sensing state. In its sensing state, the microphone 210 is coupled with the power source 240 over the first power line and, thus, is powered on as illustrated with the solid line between the microphone 210 and the power source 240. Also in its sensing state, the microphone 210 is coupled with the SoC 220 over the first data line and, thus, outputs audio data to the SoC 220, as illustrated with the solid line between the microphone 210 and the SoC 220. Similarly, in its sensing state, the camera 215 is coupled with the power source 240 over the second power line and, thus, is powered on as illustrated with the solid line between the camera 215 and the power source 240. Also in its sensing state, the camera 215 is coupled with the SoC 220 over the second data line and, thus, outputs video data to the SoC 220, as illustrated with the solid line between the camera 215 the SoC 220.

Upon the button activation 250, the computing device 200 is in the mute state, whereby the microphone 210 is in its mute state and the camera 215 is in its mute state. In its mute state, the microphone 210 is decoupled from the power source 240 as illustrated with the dotted line between the microphone 210 and the power source 240 (e.g., an open is created in the first power line). Also in its mute state, the output of the microphone 210 to the SoC 220 is blanked, as illustrated with the dotted line between the microphone 210 and the SoC 220. Similarly, in its mute state, the camera 215 is decoupled from the power source 240 as illustrated with the dotted line between the camera 215 and the power source 240 (e.g., an open is created in the second power line). Also in its mute state, the output of the camera 215 to the SoC 220 is blanked, as illustrated with the dotted line between the camera 215 and the SoC 220.

To unmute the computing device 200 (e.g., exit its mute state and re-enter its sensing state), the mute button can be selected again. In an example, the transition from the sensing state to the mute state based on the button activation 250 and/or the transition from the mute state to the sensing state based on the mute button deactivation can be controlled by the mute controller to prevent any controls by the SoC 220 over the transitions. For instance, the SoC 220 (or a program code being executed thereon) is prevented from transitioning any of the microphone 210 or the camera 215 out of the respective mute state once the button activation 250 occurs. In this way, any compromise to software of the SoC 220 cannot affect this transition.

To indicate the mute state, the computing device 200 includes a light source, as further shown in the next figures. The light source includes, among other components, light elements such as LEDs. Upon the button activation 250, the light elements are controlled (e.g., by the mute controller, as further described in connection with the next figures) to emit light as a visual indicator of the computing device's 200 mute state. The light elements can be disposed within, around, and/or in vicinity of the mute button, can be located at a particular location in the computing device 200 (e.g., at a top surface), and/or can be distributed along one or more surfaces (e.g., as an external ring around the top surface). The light source is an example of a user interface that indicates the computing device's 200 mute state. Of course, other types of user interfaces are possible including, for instance, an audio interface (e.g., a speaker that plays a particular set of chimes to indicate the computing device's 200 mute state) and/or a graphical user interface (GUI) that displays a set of notifications to indicate the computing device's 200 mute state. In the computing device's 200 sensing state, the light elements may not emit light (and, similarly, other types of user interfaces may not present the set of indications about the mute states).

Although FIG. 2 illustrates the computing device 200 as including a single SoC 220 and a single power source 240, other configurations of the computing device 200 are possible. For instance, the computing device 200 can include more than one SoC, each coupled to one of the microphone 210 or the camera 215, and/or more than one power source, each coupled to one of the microphone 210 or the camera 215.

Furthermore, although FIG. 1 illustrates a computing device that includes a single sensor, and although FIG. 2 illustrates a computing device that includes two sensors, a larger number of sensors (e.g., more than two) is possible to include in a computing device. Nonetheless, and as further illustrated in the next figures, a single mute controller may suffice to support any number of sensors. This mute controller can be thought of as a universal controller capable of supporting one or more sensors and one or more different types of sensors. To account for the variability in the number and/or type of sensors, one or more, as applicable, gating peripherals included in the computing device, where the gating peripheral(s) is (are) coupled with the mute controller, the sensor(s), and the SoC.

In an example, the button included any of the computing device 100 or the computing device 200 is implemented as a push and hold button. Upon a push and hold of the button for a time duration smaller than a predefined time length (e.g., three seconds or some other time value), the relevant sensor(s) (e.g., any of the microphones 110 or 210 and, as applicable, the camera 215) is disabled. Upon a push and hold of the button for a time duration larger than the predefined time length, the relevant sensor(s) are not automatically muted. Instead, for instance, a user notification is presented (e.g., via a speaker or a GUI) to confirm that the mute state should be entered.

Figure 3:
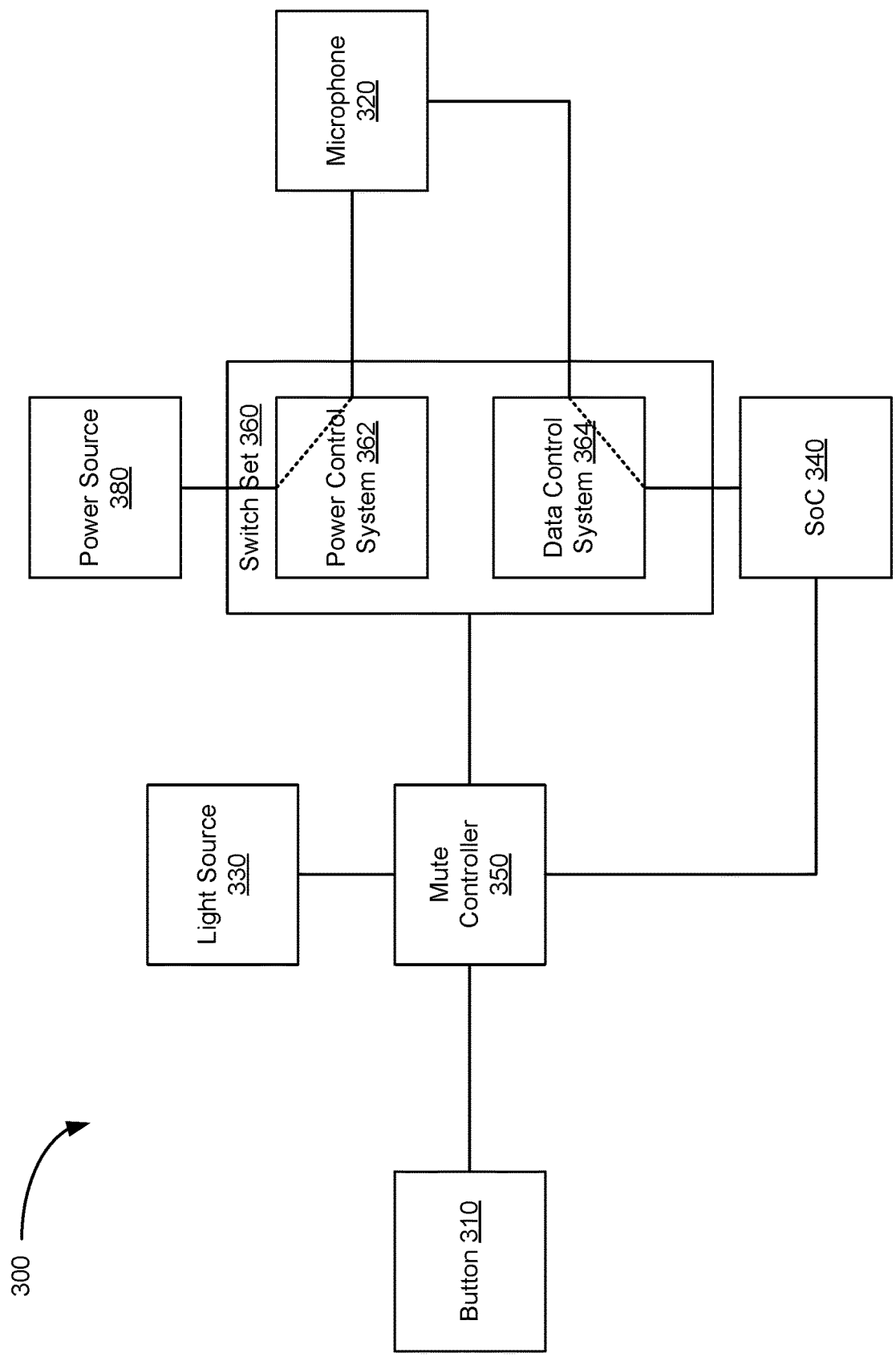
FIG. 3 illustrates an example of a diagram of a computing device that controls a sensing state of a sensor of the computing device, according to embodiments of the present disclosure.

FIG. 3 illustrates an example of a diagram of a computing device 300 that controls a sensing state of a sensor of the computing device 300, according to embodiments of the present disclosure. In this illustrative example, the sensor is a microphone 320 (although other types of the sensor are equivalently possible) and the computing device 300 is an example of the computing device 100 of FIG. 1.

As illustrated, the computing device 300 includes a button 310, the microphone 320, a light source 330, a SoC 340, a mute controller 350, a switch set 360, and a power source 380. The button 310 can be a mute button operable to mute the microphone 320. The button 310 is coupled with the mute controller 350 over a data line that carries a mute button signal from the button 310 to the mute controller 350. Other components can be coupled on this data line including, for instance, a resistor and capacitor (R/C) circuit connected in between the button 310 and the mute controller 350, where this R/C circuit filters out edges of the mute button signal. The button 310 can be implemented as a switch. When the switch is open, the mute button signal is set to inactive to indicate that the computing device 300 (or, equivalently, the microphone 320) should be in the sensing state. When the switch is closed, the mute button signal is set to active to indicate that the computing device 300 (or, equivalently, the microphone 320) a request to stop the sensing state and be in the mute state instead. Inactive and active can be set by using a low voltage "L" (e.g., 0 VDC) for inactive and a high voltage "H" (e.g., 5 VDC) for active, or vice versa depending on the implementation.

In addition to receiving the mute button as a first input signal, the mute controller 350 can receive additional input signals. For instance, the mute controller 350 is coupled with the SoC 340 over a data line and with the light source 330 over another data line. From the SoC 340, the mute controller 350 receives a mute setting signal and a light source intensity signal. The mute setting signal indicates whether the SoC 340 is operating under the assumption that the microphone 320 is in the sensing state (e.g., mute setting signal set to inactive) or is in the mute state (e.g., mute setting signal set to active). The light source intensity signal indicates a setting according to which the light source 330 should emit light to indicate the mute state (e.g., the setting can be a power setting for the light emission).

From the light source 330, the mute controller 350 receives a light source voltage feedback signal indicating a voltage level at the light source 330 (e.g., at a cathode of an LED of the light source 330). As further described in the next figures, the mute controller 350 can determine a failure in the light source 330 based on the voltage level (e.g., a hardware failure causing the light source to emit visible light when no such light emission should be occurring) and can force, as applicable, the transition from the sensing state to the mute state.

Based on the received input signals, the mute controller 350 can generate and output multiple output signals. For redundancy and higher fidelity, some of the output signals can be redundant. In addition, for a graceful termination of relevant software execution on the SoC 340, some of the output signals can be delayed relative to other output signals. In an example, the mute controller 350 is dedicated hardware that implements logic to generate the output signals based on the input signals, where this dedicated hardware can include transistors, diodes, and other electronic components representing logic gates as further described in connection with FIG. 6. In another example, the mute controller 350 can be implemented as a field-programmable gate array (FPGA), a microprocessor, a central processing unit (CPU), an SoC, and/or other circuitry that may execute firmware and/or software, where such circuitry is non-programmable, to prevent any compromise in the SoC 340 from impacting the controls of the mute controller 350.

In an example, the mute controller 350 is coupled with the light source 330, the SoC 340, and the switch set 360 over data lines that carry the output signals. To the light source 330, the mute controller 350 sends a light source on/off signal and a light source intensity signal. One value of the light source on/off signal indicates that the light source should emit visible light (e.g., the light source on/off signal is set to active"). Another value of the light source on/off signal indicates that the light source should not emit visible light (e.g., the light source on/off signal is set to inactive). When visible light should be emitted, the light source intensity signal indicates a setting for the light emission (e.g., the power level of the light emission), where this setting can correspond to the setting indicated by the SoC 340 in one of the input signals to the mute controller 350.

To the SoC 340, the mute controller 350 outputs a button selection signal and, optionally, a mute status signal. One value of the button selection signal indicates that the button 310 was selected (e.g., indicates an activation of the button 310). For instance, the button selection signal is set to inactive to indicate the mute state). Another value of the button selection signal that the button 310 was deselected (e.g., indicates a deactivation of the button 310). For instance, the button selection signal is set to active to indicate the sensing state). The mute status signal can indicate the operational status of the microphone 320 (e.g., whether in the mute state or the sensing state). For instance, the mute status signal is set to active to indicate the sensing state and set to inactive to indicate the mute state. When the two signals are used, the mute controller 350 transmits the mute status signal to the SoC 340 following a delay time interval relative to the transmission of the button selection signal, where the delay time interval is large enough to enable the SoC 340 to gracefully terminate the execution of any microphone-related program code. In other words, when the two signals are used, the button selection signal indicates that the button 310 has been selected and the microphone 320 is about to enter at the end of the delay time interval, and the mute status signal indicates to the SoC 340 that the microphone 320 is now actually in the mute state.

To the switch set 360, the mute controller 350 outputs a first mute state signal and, optionally, a second mute state signal. The second mute state signal can be redundant to the first mute state signal. For instance, the second mute state signal is an invert of the first mute state signal. By using an invert, logic (e.g., implemented as logic gates) can be included in the switch set 360 to help against controls of the SoC 340 over the controls of the mute controller 350 and/or operations of the switch set 360, as further described in the next figures. In addition, the first mute state signal (and, similarly, the second mute state signal) can be delayed by the delay time interval relative to the button selection signal transmitted to the SoC 340. One value of the first mute state signal indicates the operational status of the microphone 320 (e.g., the first mute state signal is set to inactive to indicate the sensing state). Another value of the first mute state signal indicates a change to the operational status of the microphone 320 (e.g., the first mute state signal is set to active to indicate the mute state).

Upon receiving the indication from the mute controller 350 that the microphone 320 should be in the mute state (e.g., by receiving the first mute state signal and, optionally, the second mute state signal), the switch set 360 decouples the microphone 320 from the power source 380 and blanks the data line that couples the microphone 320 to the SoC 340. Conversely, upon receiving the indication from the mute controller 350 that the microphone 320 should be in the sensing state (e.g., by receiving the first mute state signal and, optionally, the second mute state signal), the switch set 360 couples the microphone 320 to the power source 380 and no longer blanks the data line that couples the microphone 320 to the SoC 340.

In an example, the switch set 360 includes a power switch system 362 and a data control system 364. The power switch system 362 receives the first mute state signal. When the first mute state signal indicates that the microphone 320 should be in the mute state (e.g., the voltage level of the first mute state signal is active"), the power switch system 362 severs a connection between the power source 380 and the microphone 320, such as by creating an open circuit (e.g., opens a switch) on the power line that couples the power source 380 and the microphone 320, thereby powering off the microphone 320. Conversely, when the first mute state signal indicates that the microphone 320 should be in the sensing state (e.g., the voltage level of the first mute state signal is inactive), the power switch system 362 closes the circuit (e.g., closes the switch) on the power line that couples the power source 380 and the microphone 320, thereby powering on the microphone 320. The power switch system 362 can include any of a power switch or a power regulator.

When only the first mute state signal is transmitted by the mute controller 350, the data control system 364 receives the first mute state signal. When redundancy is used, where the second mute state signal is also transmitted by the mute controller 350, the data control system 364 receives the second mute state signal instead. In both cases, when the mute state is indicated, the data control system 364 zeros the voltage level on the data line. When the sensing state is indicated, no zeroing is performed, thereby the actual audio data sent by the microphone 320 is carried over the data line to the SoC 340. The data control system 364 can include any of a data switch or a set of logic gates.

As illustrated in FIG. 3, the mute controller 350 is implemented and operated separately from the SoC 340 to increase the security of the muting of the microphone 320. Such an implementation can also involve implementing the switch set 360 separately from the SoC 340. The switch set 360 can be implemented in the mute controller 350. However, the switch set 360 can be implemented separately from the mute controller 350, so that the mute controller 350 can be designed as a universal mute controller that can be coupled with multiple switch sets, each corresponding to one or more sensors, as further described in FIG. 4. In this way, each switch set can be implemented as a gating peripheral.

Figure 4:
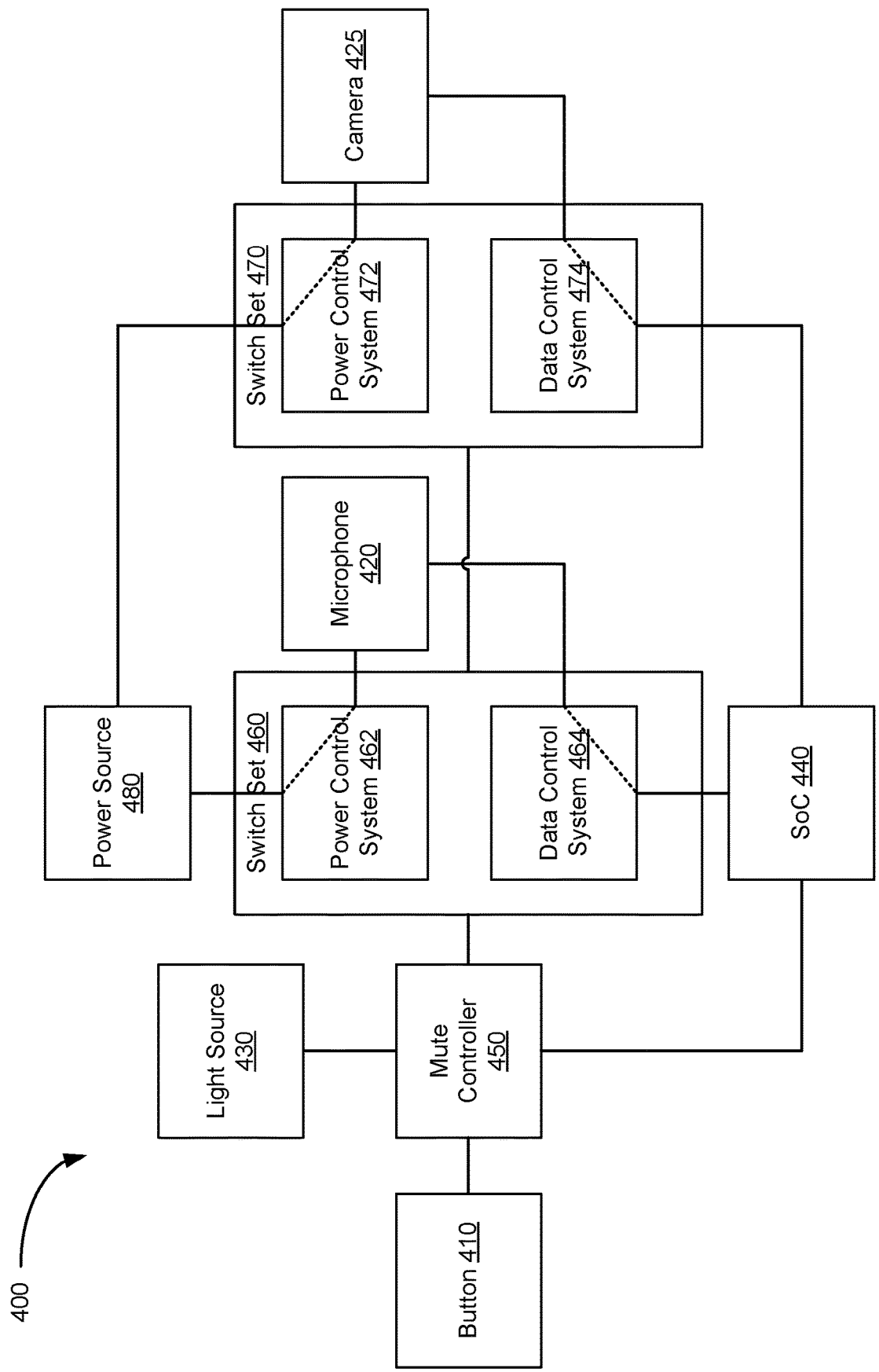
FIG. 4 illustrates an example of a diagram of a computing device that controls sensing states of multiple sensors of the computing device, according to embodiments of the present disclosure.

FIG. 4 illustrates an example of a diagram of a computing device 400 that controls sensing states of multiple sensors of the computing device 400, according to embodiments of the present disclosure. In this illustrative example, the sensors include two sensors, although other types of the sensors are equivalently possible. A first sensor is a microphone 420. The second sensor is a camera 425. The computing device 400 is an example of the computing device 200 of FIG. 2. A sensing state of the computing device 400 corresponds to both the microphone 420 and the camera 425 being in a respective sensing state. A mute state of the computing device 400 corresponds to both the microphone 420 and the camera 425 being in a respective mute state.

As illustrated, the computing device 400 includes a button 410, the microphone 420, the camera 425, a light source 430, a SoC 440, a mute controller 450, a switch set 460, a switch set 470, and a power source 480. Each of the button 410, the microphone 420, the light source 430, the SoC 440, the mute controller 450, and the switch set 460 can be the same as the button 310, the microphone 320, the light source 330, the SoC 340, the mute controller 350, and the switch set 360, respectively, of FIG. 3. The switch set 470 is implemented to couple the mute controller 450 to the camera 425, thereby extending the controls of the mute controller 450 to not only cover the microphone 420, but to also cover the camera 425.

In an example, the button 410 is a mute button operable to mute the microphone 320 and the camera 425. The button 410 is coupled with the mute controller 450 over a data line that carries a mute button signal from the button 410 to the mute controller 450. Other components can be coupled on this data line including, for instance, an R/C circuit connected in between the button 410 and the mute controller 450, where this R/C circuit filters out edges of the mute button signal. The button 410 can be implemented as a switch. When the switch is open, the mute button signal is set to inactive to indicate that the computing device 400 (or, equivalently, the microphone 420 and the camera 425) should be in the sensing state. When the switch is closed, the mute button signal is set to active to indicate that the computing device 400 (or, equivalently, the microphone 420 and the camera 425) sent a request to stop the sensing state and be in the mute state instead.

In addition to receiving the mute button as a first input signal, the mute controller 450 can receive additional input signals. For instance, the mute controller 450 is coupled with the SoC 440 over a data line and with the light source 430 over another data line. From the SoC 440, the mute controller 450 receives a mute setting signal and a light source intensity signal. The mute setting signal indicates whether the SoC 440 is operating under the assumption that the computing device 400 is in the sensing state (e.g., mute setting signal set to inactive) or is in the mute state (e.g., mute setting signal set to active). The light source intensity signal indicates a setting according to which the light source 430 should emit light to indicate the mute state (e.g., the setting can be a power setting for the light emission).

From the light source 430, the mute controller 450 receives a light source voltage feedback signal indicating a voltage value at the light source 430 (e.g., at an input or output of the light source, such as at a cathode of an LED of the light source 430). As further described in the next figures, the mute controller 450 can determine a failure in the light source 430 based on the voltage value (e.g., a hardware failure causing the light source to emit visible light when no such light emission should be occurring) and can force, as applicable, the transition from the sensing state to the mute state.

Based on the received input signals, the mute controller 450 can generate and output multiple output signals. For redundancy and higher fidelity, some of the output signals can be redundant. In addition, for a graceful termination of relevant software execution on the SoC 440, some of the output signals can be delayed relative to other output signals. In an example, the mute controller 450 is dedicated hardware that implements logic to generate the output signals based on the input signals, where this dedicated hardware can include transistors, diodes, and other electronic components representing logic gates as further described in connection with FIG. 6. In another example, the mute controller 450 can be implemented as an FPGA, a microprocessor, a CPU, an SoC, and/or other circuitry that may execute firmware and/or software, where such circuitry is non-programmable, to prevent any compromise in the SoC 440 from impacting the controls of the mute controller 450.

In an example, the mute controller 450 is coupled with the light source 430, the SoC 440, the switch set 460, and the switch set 470 over data lines that carry the output signals. To the light source 430, the mute controller 450 sends a light source on/off signal and a light source intensity signal. One value of the light source on/off signal indicates that the light source should emit visible light (e.g., the light source on/off signal is set to active). Another value of the light source on/off signal indicates that the light source should not emit visible light (e.g., the light source on/off signal is set to inactive). When visible light should be emitted, the light source intensity signal indicates a setting for the light emission (e.g., the power level of the light emission), where this setting can correspond to the setting indicated by the SoC 440 in one of the input signals to the mute controller 450.

To the SoC 440, the mute controller 450 outputs a button selection signal and, optionally, a mute status signal. One value of the button selection signal indicates that the button 410 was selected (e.g., indicates an activation of the button 410). For instance, the button selection signal is set to inactive to indicate the mute state). Another value of the button selection signal that the button 410 was deselected (e.g., indicates a deactivation of the button 410. For instance, the button selection signal is set to active to indicate the sensing state. The mute status signal can indicate the operational status of the computing device 400 (e.g., whether in the mute state or the sensing state). For instance, the mute status signal is set to active to indicate the sensing state and set to inactive to indicate the mute state. When the two signals are used, the mute controller 450 transmits the mute status signal to the SoC 440 following a delay time interval relative to the transmission of the button selection signal, where the delay time interval is large enough to enable the SoC 440 to gracefully terminate the execution of any microphone-related program code and/or any camera-related program code. In other words, when the two signals are used, the button selection signal that the button 410 has been selected and the computing device 400 is about to enter at the end of the delay time interval, and the mute status signal indicates to the SoC 440 that the computing device 400 is now actually in the mute state.

To the switch set 460, the mute controller 450 outputs a first mute state signal and, optionally, a second mute state signal. The second mute state signal can be redundant to the first mute state signal. For instance, the second mute state signal is an invert of the first mute state signal. By using an invert, logic (e.g., implemented as logic gates) can be included in the switch set 460 to help against controls of the SoC 440 over the controls of the mute controller 450 and/or operations of the switch set 460, as further described in the next figures. In addition, the first mute state signal (and, similarly, the second mute state signal) can be delayed by the delay time interval relative to the button selection signal transmitted to the SoC 440. One value of the first mute state signal indicates the operational status of the microphone 420 (e.g., the first mute state signal is set to inactive" to indicate the sensing state of the microphone 420). Another value of the first mute state signal indicates a change to the operational status of the microphone 420 (e.g., the first mute state signal is set to active to indicate the mute state of the microphone 420).

Upon receiving the indication from the mute controller 450 that the microphone 420 should be in the mute state (e.g., by receiving the first mute state signal and, optionally, the second mute state signal), the switch set 460 decouples the microphone 420 from the power source 480 and blanks the data line that couples the microphone 420 to the SoC 440. Conversely, upon receiving the indication from the mute controller 450 that the microphone 420 should be in the sensing state (e.g., by receiving the first mute state signal and, optionally, the second mute state signal), the switch set 460 couples the microphone 420 to the power source 480 and no longer blanks the data line that couples the microphone 420 to the SoC 440.

In an example, the switch set 460 includes a power switch system 462 and a data control system 464. The power switch system 462 receives the first mute state signal. When the first mute state signal indicates that the microphone 420 should be in the mute state (e.g., the voltage level of the first mute state signal is active"), the power switch system 462 severs a connection between the power source 480 and the microphone 420, such as by creating an open circuit (e.g., opens a switch) on the power line that couples the power source 480 and the microphone 420, thereby powering off the microphone 420. Conversely, when the first mute state signal indicates that the microphone 420 should be in the sensing state (e.g., the voltage level of the first mute state signal is inactive), the power switch system 462 closes the circuit (e.g., closes the switch) on the power line that couples the power source 480 and the microphone 420, thereby powering on the microphone 420.

When only the first mute state signal is transmitted by the mute controller 450, the data control system 464 receives the first mute state signal. When redundancy is used, where the second mute state signal is also transmitted by the mute controller 450, the data control system 464 receives the second mute state signal instead. In both cases, when the mute state is indicated, the data control 464 zeros the voltage level on the data line. When the sensing state is indicated, no zeroing is performed, thereby the actual audio data sent by the microphone 420 is carried over the data line to the SoC 440. The data control system 464 can include any of a data switch or a set of logic gates.

To the switch set 470, the mute controller 450 also outputs the first mute state signal and, optionally, the second mute state signal. For instance, the one or more data lines that couple the mute controller 450 with the switch set 460 also couple the mute controller with the other switch set 470.

Upon receiving the indication from the mute controller 450 that the microphone 420 should be in the mute state (e.g., by receiving the first mute state signal and, optionally, the second mute state signal), the switch set 470 decouples the camera 425 from the power source 480 and blanks the data line that couples the camera 425 to the SoC 440. Conversely, upon receiving the indication from the mute controller 450 that the camera 425 should be in the sensing state (e.g., by receiving the first mute state signal and, optionally, the second mute state signal), the switch set 470 couples the camera 425 to the power source 480 and no longer blanks the data line that couples the camera 425 to the SoC 440.

In an example, the switch set 470 includes a power switch system 472 and a data switch 474. The power switch system 472 receives the first mute state signal. When the first mute state signal indicates that the camera 425 should be in the mute state (e.g., the voltage level of the first mute state signal is active), the power switch system 472 severs a connection between the power source 480 and the camera 425, such as by creating an open circuit (e.g., opens a switch) on the power line that couples the power source 480 and the camera 425, thereby powering off the camera 425. Conversely, when the first mute state signal indicates that the camera 425 should be in the sensing state (e.g., the voltage level of the first mute state signal is inactive), the power switch system 472 closes the circuit (e.g., closes the switch) on the power line that couples the power source 480 and the camera 425, thereby powering on the camera 425. Each of one of the power switch systems 462 and 472 can include any of a power switch or a power regulator.

When only the first mute state signal is transmitted by the mute controller 450, the data control system 474 receives the first mute state signal. When redundancy is used, where the second mute state signal is also transmitted by the mute controller 450, the data control system 474 receives the second mute state signal instead. In both cases, when the mute state is indicated, the data control switch 474 sets an override signal on the data line between the camera 425 and the SoC 440. Different types of overrides are possible. In one example, the override signal indicates that the camera is disabled (e.g., the override signal is a camera disable signal). In another example, the override signal can zero any video data that would have been otherwise transmitted from the camera 425 to the SoC 440 (in which case, the data line can include multiple data lines, each carrying a subset of the video data). When the sensing state is indicated, no override signal is used, thereby the actual audio data sent by the microphone 420 is carried over the data line to the SoC 440. The data control system 474 can include any of a data switch or a set of logic gates.

As illustrated in FIGS. 3 and 4, the mute controller 450 can be implemented as a universal mute controller. Controls by the universal mute controller can extended to multiple sensors by coupling the universal mute controller to multiple switch sets, each implemented as a gating peripheral and coupled to a corresponding sensor. The first mute state signal and, optionally, the second mute state signal are transmitted from the universal mute controller to each of the switch sets to control operations of these switch sets.

Figure 5:
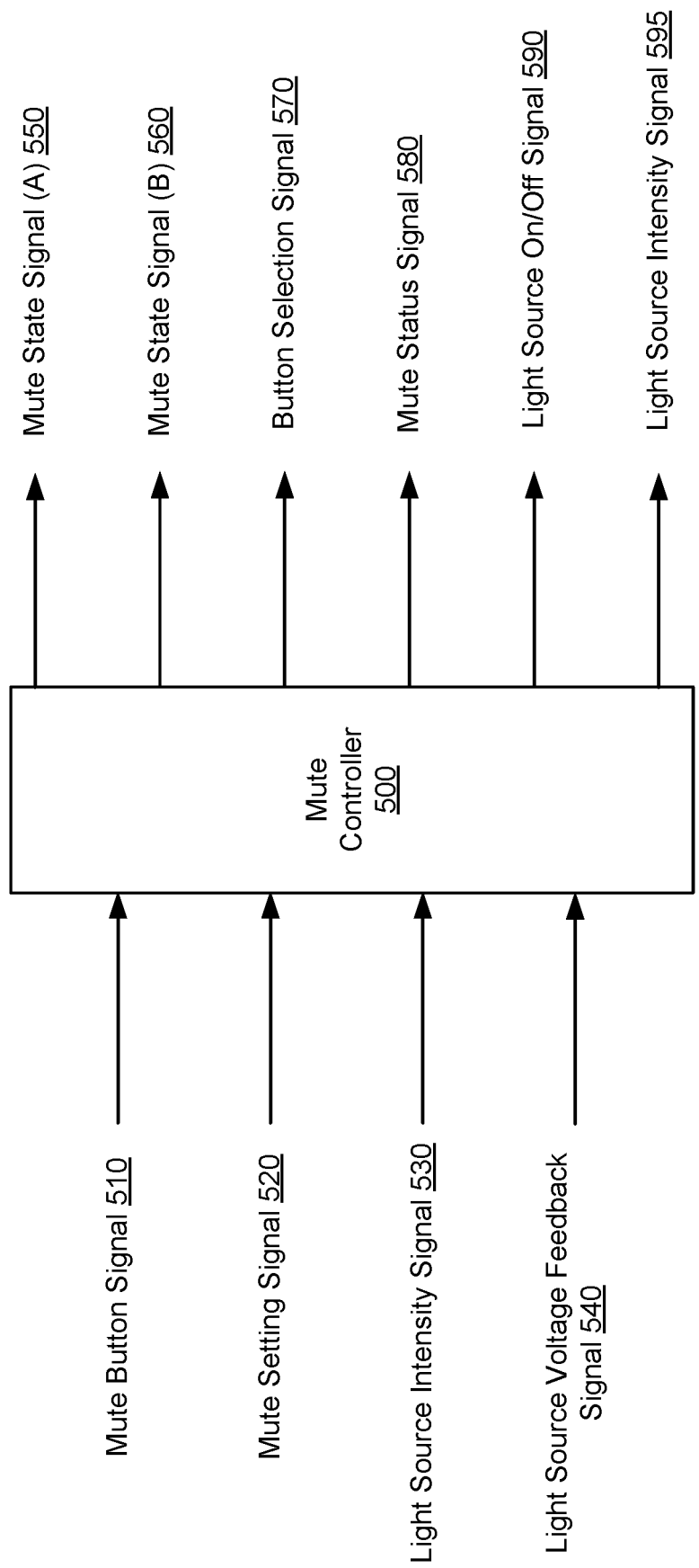
FIG. 5 illustrates an example of a mute controller, according to embodiments of the present disclosure.

FIG. 5 illustrates an example of a mute controller 500, according to embodiments of the present disclosure. The mute controller 500 receives multiple input signals from a mute button, SoC, and a light source of a computing device and outputs multiple output signals to a switch set, the SoC, and the light source of the computing device. The mute controller is an example of the mute controller 350 of FIG. 3 and the mute controller 450 of FIG. 4.

The input signals include a mute button signal 510 from the button, a mute setting signal 520 and a light source intensity signal 530 from the SoC, and a light source voltage feedback signal 540 from the light source. The mute button signal 510, the mute setting signal 520, the light source intensity signal 530, and the light source voltage feedback signal 540 correspond to the input signals described in connection with FIGS. 3 and 4.

The output signals include a mute state signal (A) 550 and, optionally for redundancy, a mute state signal (B) 560 to the switch set, a button selection signal 570 and, optionally for redundancy and graceful software termination, a mute status signal 580 to the SoC, and a light source on/off signal 590 and a light source intensity signal 595 to the light source. The mute state signal (A) 550, the mute state signal (B) 560, the button selection signal 570, the mute status signal 580, the light source on/off signal 590, and the light source intensity signal 595 correspond to the output signals described in connection with FIGS. 3 and 4.

In an example, the controller 500 implements logic, in hardware and/or software, to generate the output signals based on the input signals. Generally, the logic uses the mute button signal 510 as a control to enter into a mute state and exit from the mute state back into a sensing state. The logic uses also the light source voltage feedback signal 540 to force the mute state upon detection of a failure in the light source. The SoC can also request the mute state via the mute setting signal 520. Once the mute state is entered, the SoC is prevented from changing the operational state back to the sensing state. In other words, the mute setting signal 520 from the SoC is not usable to transition to the sensing state and only the mute button signal 510 or the light source intensity signal 530 (upon detection that the failure no longer exists) are usable for the transition to the sensing state. This logic can be implemented, for instance, as a set of logic gates in hardware and/or in part as a look-up table in software.

In particular, when the mute button signal 510 indicates a push of a button (e.g., a request to stop the sensing state and enter the mute state), the mute controller 500 also determines whether a sensor is in the mute state or not. For instance, the controller 500 stores an indication (e.g., a flag or a bit) of an operational state of the sensor (e.g., whether in the sensing state or the mute state). If the sensor is already in the mute state, the sensor is already disabled and the controller need not decouple the sensor from a power source and/or the SoC. If the sensor is in the sensing state, the sensor is enabled and the controller 500 updates the indication to store the mute state. The toggling of the operational state to the mute state results in the mute controller 500 setting the various output signals to indicate the mute state.

Similarly, when the light source voltage feedback signal 540 indicates a voltage value at the light source, where the voltage value is large enough to permit the emission of visible light, the mute controller 500 also determines whether the mute setting signal 520 indicates that the SoC is operating under the assumption that the computing device is in the mute state. If not, the mute controller 500 detects a failure at the light source because the light source is emitting visible light indicating that the computing device is in the mute state, whereas the SoC is operating under the assumption of the sensing state. Because the emitted light can be visible to a user, the user experience is accorded a higher priority, and the mute controller 500 forces the mute state. In this case, the mute controller 500 stores the mute state (e.g., by updating the indication of the operational status) and sets the various output signals to indicate the mute state. If the SoC is already operating under the mute state, the mute controller 500 continues to generate the output signals indicating the mute state. When the voltage value indicates normal operations of the light source, the mute controller 500 accords higher priority to the mute button signal 510 and/or the mute setting signal 520.

When the failure of the light source is detected and the mute state is entered without the button being activated, a notification can be provided to the user to indicate the failure. Depending on the type of user interfaces that the computing device supports, the notification can include audio data output on a speaker of the computing device and/or text data output at a GUI of the computing device. Further, the notification can be output automatically upon disabling the sensor. Alternatively, the notification can be output upon receiving the mute button signal 510 indicating a selection of the button (e.g., activation) subsequent to the disabling of the sensor.

In comparison, when the mute setting signal 520 indicates a request for the mute state (e.g., set to active), this request can correspond to an application request from the SoC to mute the computing device (e.g., based on a natural language utterance detected by the computing device and processed as a command to mute the computing device). In this case, the mute controller 500 determines whether operational status is the mute state, the mute button signal 510 already indicates the request, and/or whether the light source voltage feedback signal 540 already forces the mute state. If not, the mute controller 500 sets the various output signals to indicate the mute state. If the mute state is already entered, requested, or forced, the mute controller 500 continues to generate the output signals indicating the mute state.

The mute setting signal 520 is sent from the SoC to request the mute state (e.g., to disable the sensor). In an example, the SoC does not use the mute setting signal 520 to request the sensing state (e.g. to re-enable the sensor). In this example, only when the mute button signal 510 indicates no request for the mute state and the light source voltage feedback signal 540 indicates no forcing of the mute state does the mute controller 500 unmute the computing device based on the mute setting signal 520 also not requesting the mute state. In another example, the SoC may use the mute setting signal to request the transition back to the sensing state. However, in this example, if the mute setting signal 520 indicates a request to transition back to the sensing state, the mute controller 500 can ignore this request and continue to output signals indicating the mute state. Alternatively, the mute controller 500 accords higher priority to the mute button signal 510 and/or the light source voltage feedback signal 540. In particular, only when the mute button signal 510 indicates no request for the mute state and the light source voltage feedback signal 540 indicates no forcing of the mute state does the mute controller 500 unmute the computing device based on the mute setting signal 520. Otherwise, the mute setting signal 520 is ignored and the mute controller 500 continues to generate the output signals indicating the mute state. In this way, the SoC is prevented from transitioning the computing device to the sensing state when either the mute button signal 510 or the light source voltage feedback signal 540 indicate that the computing device should be in the mute state.

In an example, the button is implemented as a push and hold button. In this case, upon the mute button signal 510 has been selected (e.g., pushed), the mute controller 500 determines a time duration during which the mute button remains selected (e.g., held). For instance, the mute controller 500 starts a timer upon the mute button signal 510 changing (e.g., from active to inactive, or vice versa depending on the implementation) and stops the time upon the mute button signal 510 changing again (e.g., from inactive to active, or vice versa depending on the implementation). The mute controller 500 compares the measured time duration between the start and the stop to a predefined time length (e.g., three seconds or some other value that may be set in a user setting). If the time duration is shorter than the predefined time length, the mute controller 500 sets the various output signals to indicate the mute state. Otherwise, the mute controller 500 does not send such outputs.

The light source voltage feedback signal 540 is input to the mute controller 500. The setting indicated by this signal 540 for the light source is sent by the controller 500 in the light source intensity signal 595.

In an example, some or all of the input signals and/or output signals are implemented in the digital domain. For instance, each of the mute button signal 510, mute setting signal 520, and light source intensity signal 530 is a digital signal that includes input data to the mute controller 500. In particular, the mute button signal 510 provides button ON data and button OFF data. The button ON data indicates that the button has been selected (e.g. pushed). The button OFF data indicates that the button has been deselected. Each of the selection and deselection can be indicated with a single bit. Similarly, the mute setting signal 520 provides mute request data. Optionally, and the mute setting signal 520 provides mute request to unmute request data (in which case the mute controller may ignore this request). Each of the mute and unmute requests can be indicated with a single bit. The light source intensity signal 530 provides light intensity data indicating a light intensity of the light source for light emission from the light source. A single bit can be used, where the light intensity can be controlled between two levels. Alternatively, multiple "N" bits can be used to provide "$2^N$" setting controls.

Further, each of the mute state signal (A) 550, the mute state signal (B) 560, the button selection signal 570, the mute status signal 580, the light source on/off signal 590, and the light source intensity signal 595 is a digital signal that includes output data sent from the mute controller 500 to a switch set, the SoC, or the light source as applicable. The mute state signal (A) 550 provides first output data indicating the mute state or the sensing state. A single bit can be used for this indication. For instance, when the first output data is set to active (e.g., a high voltage level "H" corresponding to a "1" bit), the mute state is indicated. When the first output data is set to inactive (e.g., a low voltage level "L" corresponding to a "0" bit), the sensing state is indicated. The mute state signal (B) 560 provides second output data indicating the mute state or the sensing state. A single bit can be used for this indication. The second output data can be redundancy to the first output data and/or can be an invert of the first output data. For instance, when the first output data is set to active to indicate the mute state, the second output data is set to inactive to also indicate the mute state. When the first output data is set to inactive to indicate the sensing state, the second output data is set to active to also indicate the sensing state. The button selection signal 570 provides third output data indicating the activation or deactivation of the button. A single bit can be used for this indication. For instance, when the third output data is set to inactive, the button activation is indicated. When the third output data is set to active, the button deselection is indicated. The mute status signal 580 provides fourth output data (e.g. microphone status data or more broadly sensor status data) indicating the status of the sensor (e.g. disabled corresponding to the mute state or enabled corresponding to the sensing state). A single bit can be used for this indication. For instance, when the fourth output data is set to inactive, the sensor disabling is indicated. When the fourth output data is set to active, the sensor enabling is indicated. The light source on/off signal 590 provides light ON data and light OFF data. The light ON data indicates that the light source should emit light. The button off data indicates that the light source should not emit light. The light source intensity signal 595 provides the light intensity data indicating the light intensity setting of the light source for the light emission.

Each one of the input data corresponding to the signals 510-540 can be received at a data input terminal of the mute controller 500. As further illustrated in FIG. 6, each data input terminal can be an input pin. Conversely, each one of the output data corresponding to the signals 550-595 can be output from a data output terminal of the mute controller 500 to data input terminals of the respective components. As further illustrated in FIG. 6, each data output terminal can be an output pin. In particular, the output data of the mute state signal (A) 550 is output to a data input terminal of a first switch of the switch set (e.g., a power switch). The output data of the mute state signal (B) 560 is output to a data input terminal of a second switch of the switch set (e.g., a data switch). The output data of the button selection signal 570 and the output data of the mute status signal 580 are output to two different data input terminals of the SoC. The output data of the light source on/off signal 590 and the output data of the light source intensity signal 595 to the light source are also output to two different data input terminals of the light source.

Figure 6A:
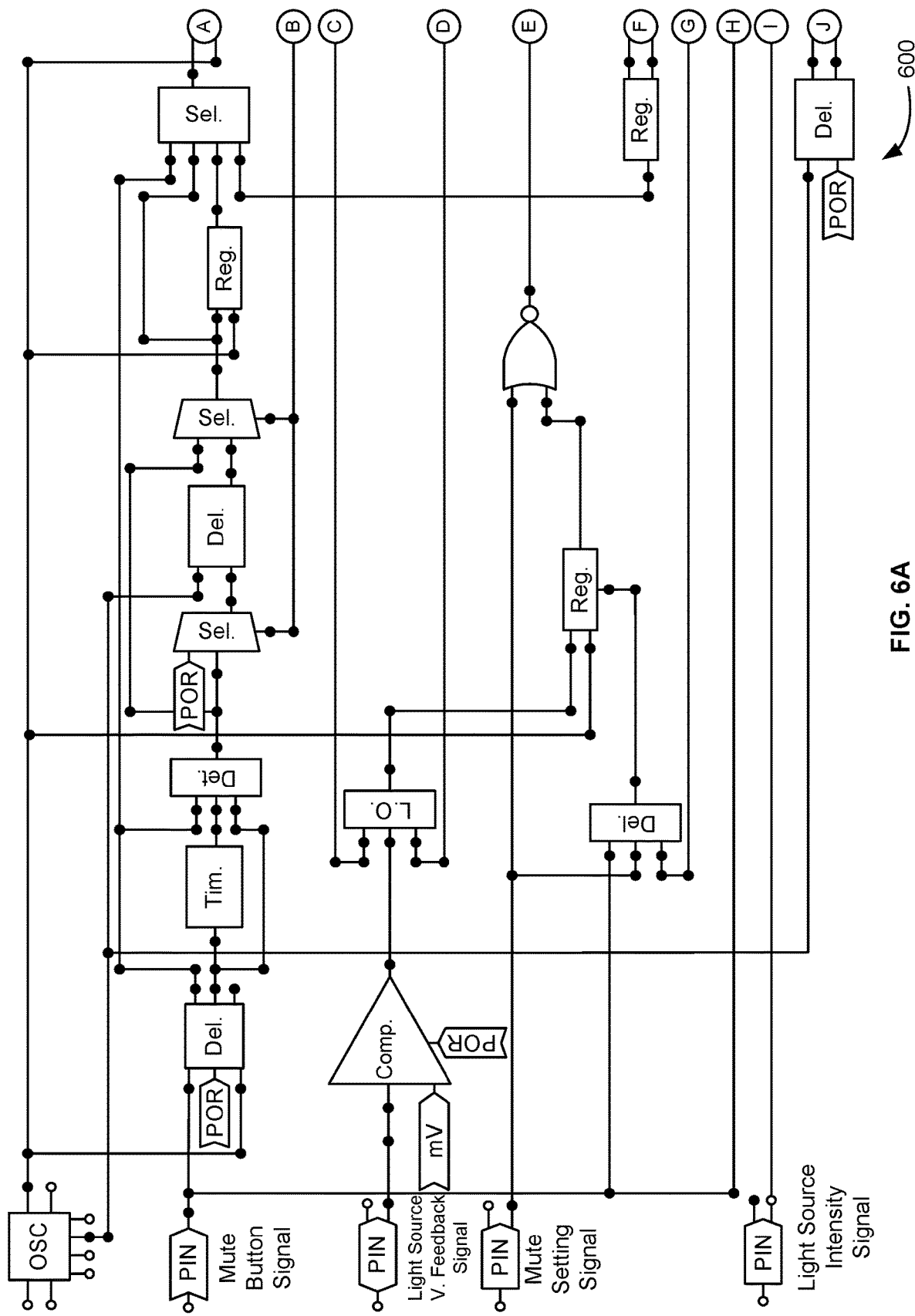
FIGS. 6A and 6B illustrate an example of components of a mute controller, according to embodiments of the present disclosure.
Figure 6B:
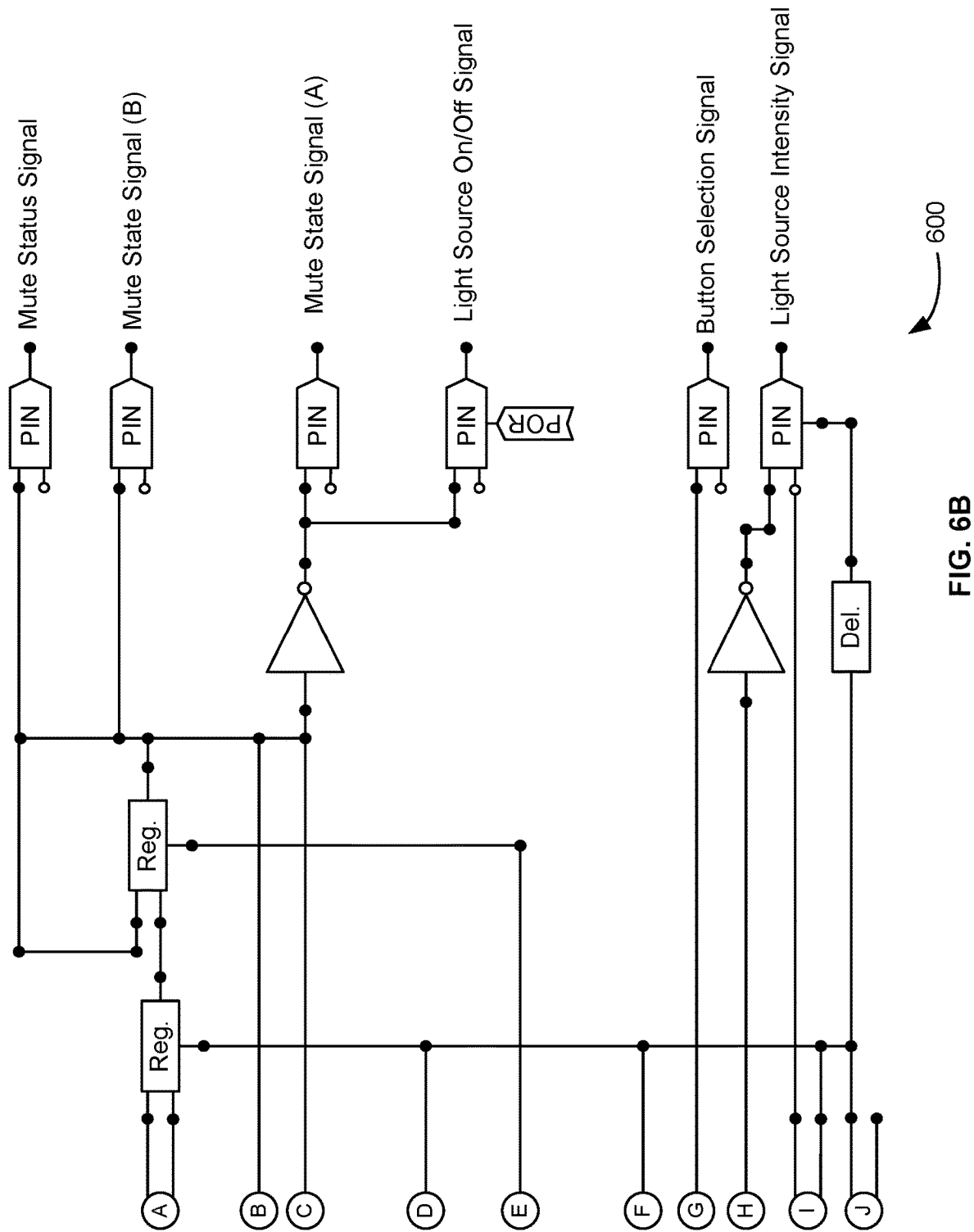

FIGS. 6A and 6B illustrates an example of components of a mute controller 600, according to embodiments of the present disclosure. As illustrated, the mute controller 600 is implemented in hardware and includes a set of logic gates. The mute controller 600 is an example implementation of the mute controller 500 of FIG. 5, although other implementations are likewise possible.

Starting with the bottom left of FIG. 6A, the mute controller 600 includes a first input pin that receives a light source intensity signal from an SoC. The first input pin is connected directly to a first output pin, such that the light source intensity signal is passed through to the first output pin. The first output pin outputs the light source intensity signal to a light source. Among the pass through pass, the inputted light source intensity signal may be inverted before being outputted.

Next, the mute controller 600 includes a second input pin and a third input pin. The second input pin receives a mute setting signal from the SoC. The third input pin receives a light source voltage feedback signal from the light source. The third input pin is connected to a comparator that compares the indicated voltage value to a reference voltage value (e.g., eight-hundred millivolts). The mute setting signal can be delayed and passed through a register and input to an XOR gate, along with an output of the comparator. The output of comparator can also be passed through the register. The output of the XOR gate can be passed through a register and provided for further processing with other signals to output pins of the mute controller 600 (e.g., as mute status signal and mute state signal (B)).

The mute controller 600 includes a fourth input pin. The fourth input pin receives a mute button signal from a mute button. The mute button signal can be passed through directly to an output pin of the mute controller 600 for output as a button selection signal. The mute button signal can be further processed by other processing components of the mute controller 600 includes a timer, a set of delay buffers, registers, D-type flip flops, path selectors, the XOR gate and provided to another output pin of the mute controller as a mute status signal.

Figure 7:
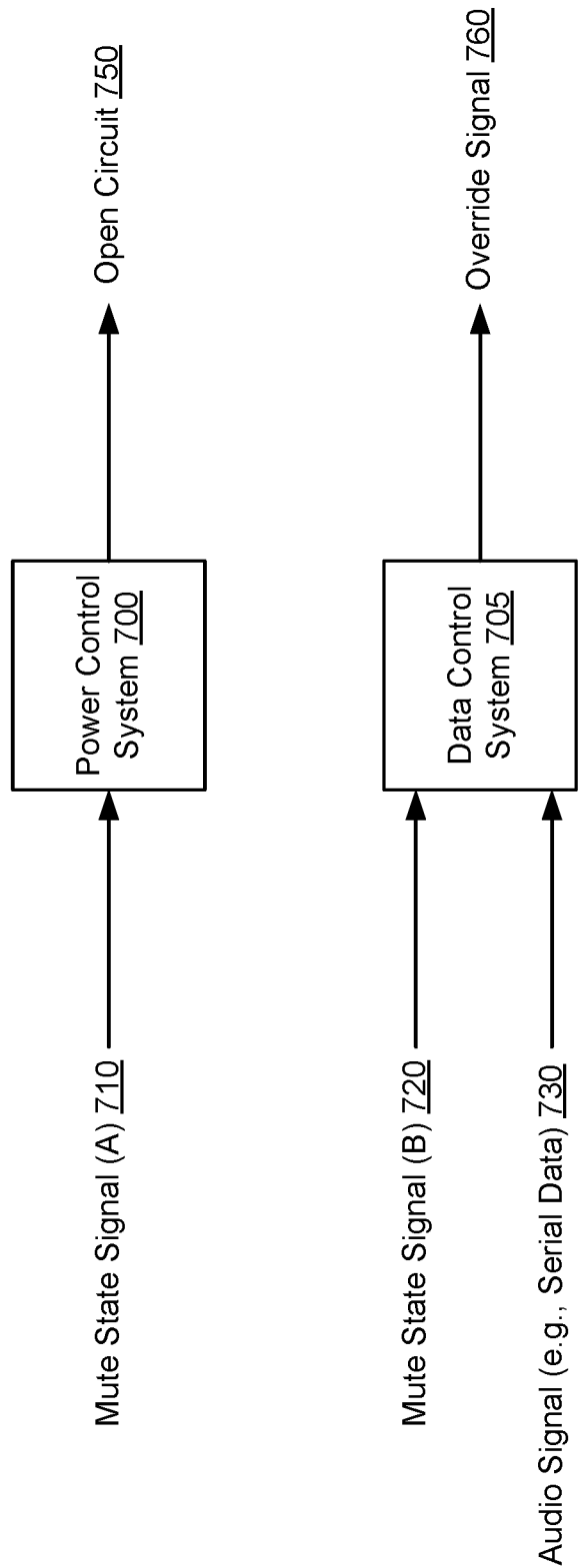
FIG. 7 illustrates an example of a power control system and a data control system, according to embodiments of the present disclosure.

FIG. 7 illustrates an example of a power control system 700 and a data control system 705, according to embodiments of the present disclosure. The power control system 700 and the data control system 705 form a switch set that is configured as a gating peripheral for a sensor, such as a microphone. The switch set is an example of the switch set 360 of FIG. 3 and the switch set 460 of FIG. 4.

In an example, the power control system 700 receives a mute state signal (A) 710. When the mute state signal (A) 710 is set to a high voltage (e.g., representing a "1" bit to indicate the mute state), the power control system 700 creates an open circuit 750 in a power line to the microphone. Otherwise, the power control system 700 closes the circuit. The power control system 700 can be implemented as a p-channel field-effect transistor (PFET transistor), with its gate receiving the mute state signal (A) 710, its source connected to a power source, and its drain connected to the microphone.

In an example, the data control system 705 receives a mute state signal (B) 720. The mute state signal (B) 720 is an invert of the mute state signal (A) 710. In addition, the data control system 705 receives audio data of the microphone (e.g., one of the inputs to the data control system 705 is connected to an output of the microphone). When the mute state signal (B) 720 is set to a low voltage (e.g., representing a "0" bit to indicate the mute state), the data control system 705 zeros the output to the data line to the SoC. Otherwise, the audio data is passed on the data line. The data control system 705 can be implemented as a tri-state buffer, with its third input connected to a power source.

Figure 8:
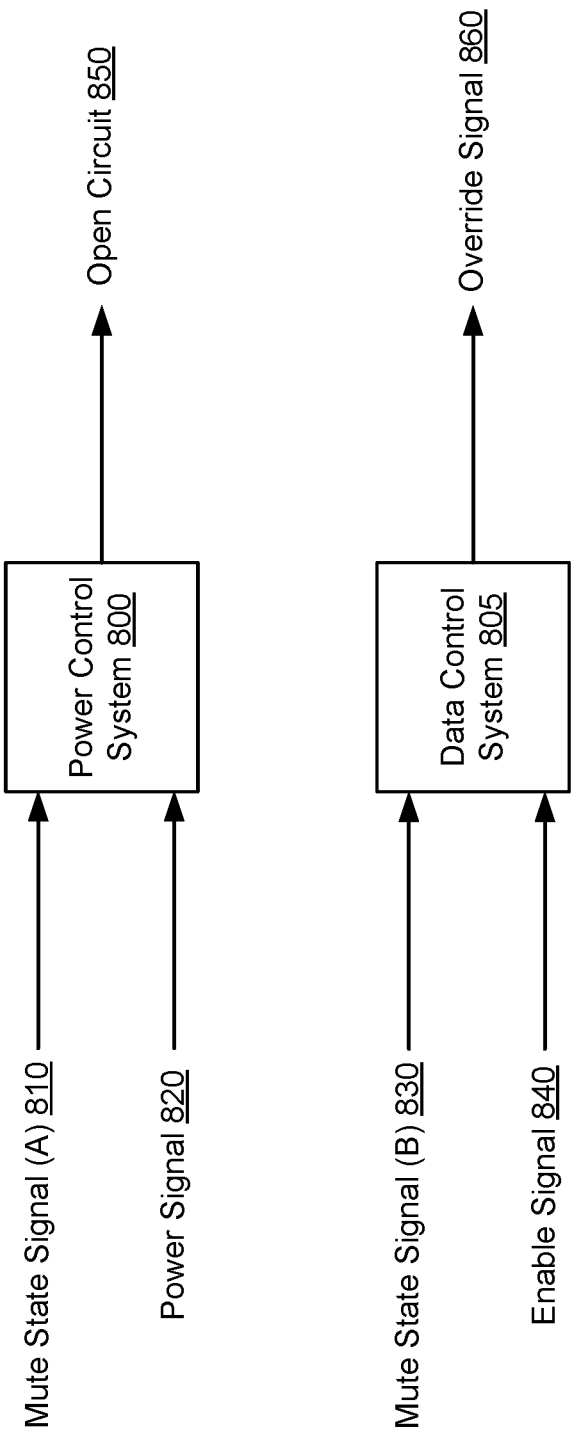
FIG. 8 illustrates another example of a power control system and a data control system, according to embodiments of the present disclosure.

FIG. 8 illustrates another example of a power control system 800 and a data control system 805, according to embodiments of the present disclosure. The power control system 800 and the data control system 805 form a switch set that is configured as a gating peripheral for a sensor, such as a camera. The switch set is an example of the switch set 470 of FIG. 4.

In an example, the power control system 800 receives a mute state signal (A) 810 and a power signal 820. The power signal 820 is received from a SoC and indicates whether the camera power is enabled or not. When the mute state signal (A) 810 is set to a high voltage (e.g., representing a "1" bit to indicate the mute state) and the power signal is set to a low voltage (e.g., representing a "0" bit to indicate that the camera power is enabled), the power control system 800 creates an open circuit 850 in a power line to the camera. Also when the mute state signal (A) 810 is set to the high voltage and the power signal is set to a high voltage (e.g., representing a "1" bit to indicate that the camera power is disabled), the power control system 800 creates the open circuit 850. Otherwise, the power control system 800 closes the circuit. The power control system 800 can be implemented as a NOR gate in series with a load switch. The mute state signal (A) 810 and the power signal 820 are input to the NOR gate, the output of which is sent as a camera power enable signal as an input to the load switch. The load switch couples and decouples the camera with a power source based on the camera power enable signal.

In an example, the data control system 805 receives a mute state signal (B) 830. The mute state signal (B) 830 is an invert of the mute state signal (A) 810. A low voltage "L" of the mute state signal (B) 830 indicates the request for the mute state. In addition, the data control system 805 receives a camera enable signal from the SoC. The camera enable signal indicates whether the camera is enabled (e.g. when this signal is set to a high voltage "H" indicating a camera enable data set as "1" bit) or disabled (e.g., when this signal is set to a low voltage "L" indicating the camera enable data set as "a "0" bit). When any of the mute state signal (B) 820 or the camera enable signal is low, the data control system 805 outputs an override signal 860 to the SoC. The override signal 860 includes a camera disable signal (e.g., a camera disabled status). Otherwise, no override signal 860 is output and, instead, the data control system 805 continues to send a camera enable signal. The data control system 805 can be implemented as an AND gate.

Figure 9:
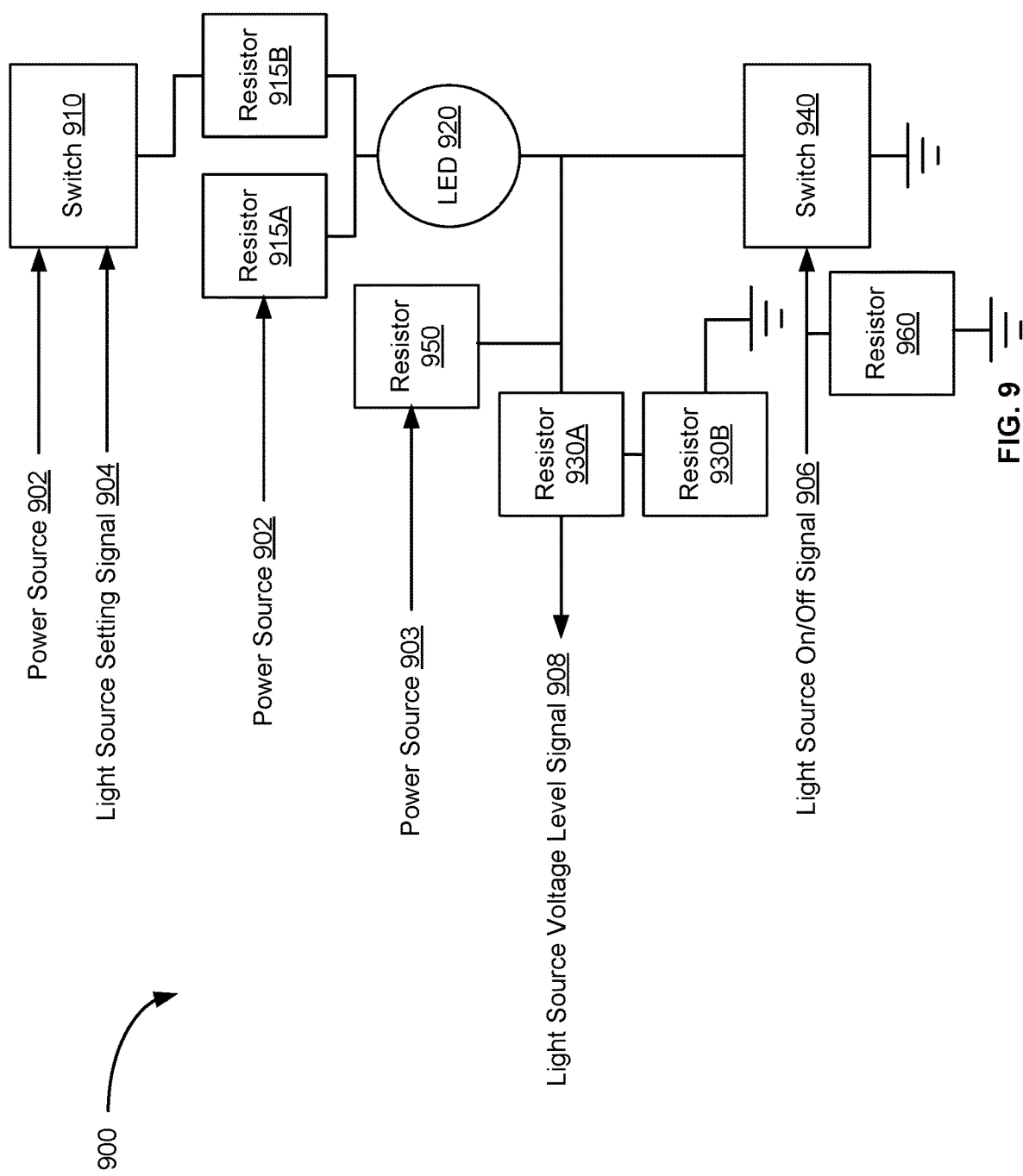
FIG. 9 illustrates an example of a user interface, according to embodiments of the present disclosure.

FIG. 9 illustrates an example of a user interface, according to embodiments of the present disclosure. As illustrated, the user interface is a light source 900, although other types of the user interface are similarly possible. The light source 900 includes a first switch 910, a first resistor set (shown as a resistor 915A and a resistor 915B), an LED 920, a second resistor set (shown as a resistor 930A and a resistor 930B), a second switch 940, a third resistor set (shown as a resistor 950), a fourth resistor set (shown as resistor 960).

The first switch 910 can be implemented as PFET and the second switch 940 can be implemented as a n-type FET transistor (NFET). The first switch 910 is connected to a power source 902 of the light source 900 and receives a light source intensity signal 904 from a mute controller. The second switch 940 receives a light source on/off source signal 906 from the mute controller. When the source signal 906 from the mute controller is set to a high voltage (e.g., indicating that the LED 920 is to be powered on), the second switch 940 enables current to flow to the LED 920 from the power source 902 via the first switch 910. The setting of this current flow is set according to the light source intensity signal 904. Otherwise, the second switch disables the current flow.

The resistor 915A is also connected to the power source 902 and has a higher resistance compared to the resistor 915B (e.g., between one-thousand and ten-thousand ohms, in comparison to between ten and one-hundred ohms). Both resistors 915A and 915B are connected to an anode of the LED 920. The resistor 930A and the resistor 930B may have similar resistance (e.g., between five-hundred thousand ohms and two-million ohms). Whereas the resistor 930B is connected to the ground, the resistor 930A is connected to a cathode of the LED 920. The voltage value at the resistor indicates a voltage value at the cathode when no current is flowing through the first switch 910 and the second switch 940. This voltage value should be minimal (e.g., below a voltage threshold corresponding to the minimum value of the cathode voltage indicating that the LED 920 is emitting visible light) when the LED 920 has no failure. Otherwise, the voltage value indicates a failure. The voltage value is output as a light source voltage feedback signal 908 to the mute controller. The resistor 950 is connected to a power source 903 and the cathode of the LED 920. The resistor 960 is connected to the input of the switch 940 and the ground.

Although FIG. 9 illustrates that the light source 900 includes a single LED 920, a single first resistor set, and a single second resistor set, other configurations of the light source 900 are possible. For example, for redundancy, the light source includes a second LED, two first resistor sets each connected to one of the LEDs, and two second resistor sets each connected to one of the LEDs.

FIGS. 10-13 illustrate flows for controlling one or more sensors of a computing device. The computing device can be any of the computing device 100 of FIG. 1 or the computing device 200 of FIG. 2. The operations of the flow can be performed by a mute controller of the computing device. The mute controller can be any of the mute controller 350 of FIG. 3, the mute controller 450 of FIG. 4, the mute controller 500 of FIG. 5, or the mute controller 600 of FIG. 6.

Figure 10:
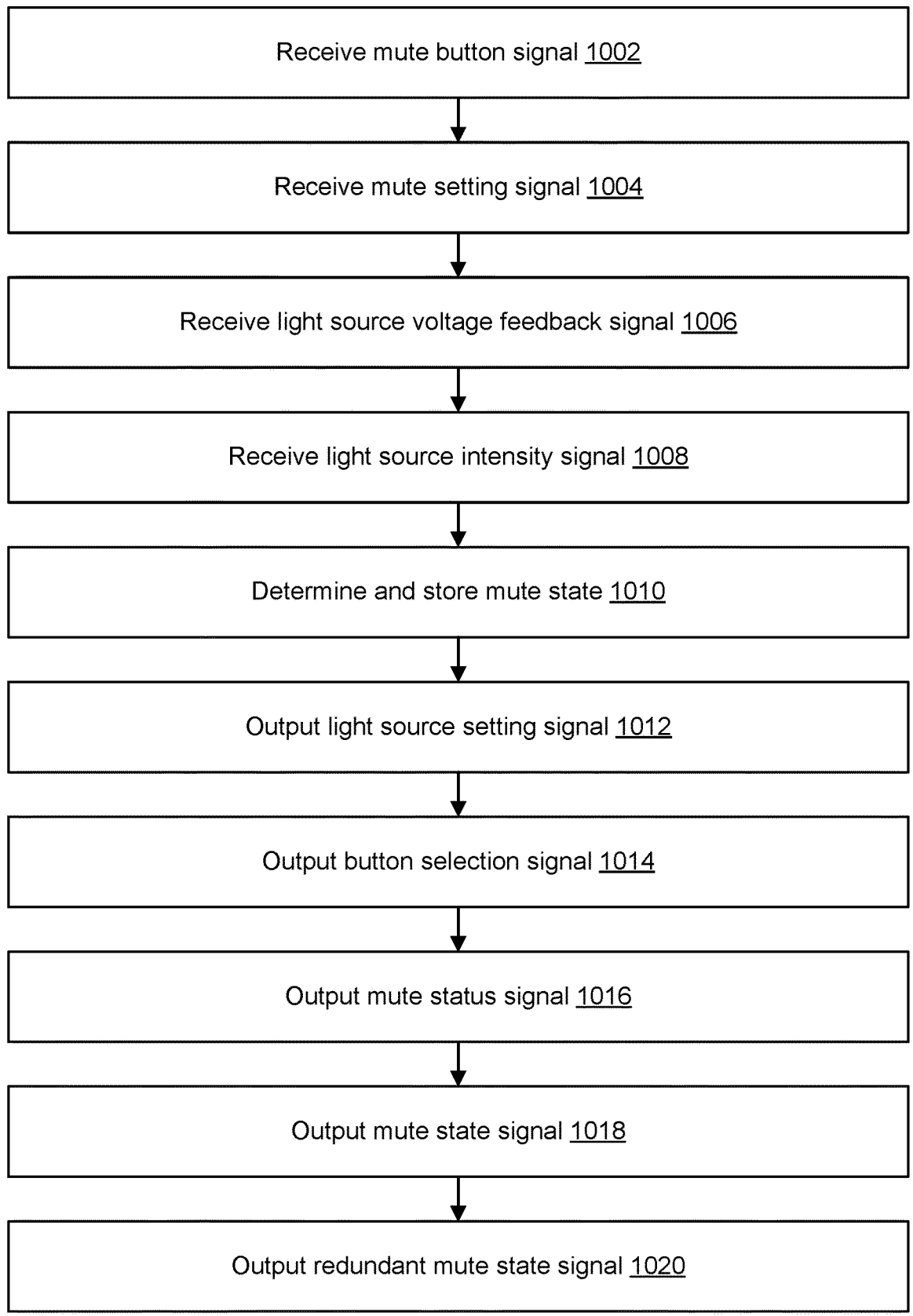
FIG. 10 illustrates an example of a flow for controlling one on more sensing states of one or more sensors of a computing device, according to embodiments of the present disclosure.

FIG. 10 illustrates an example of a flow for controlling one on more sensing states of the one or more sensors, according to embodiments of the present disclosure. In an example, the flow starts at operation 1002, where the mute controller receives a mute button signal. For example, the mute button signal corresponds to the mute button signal 510 of FIG. 5 and is received as a first input signal from a mute button of the computing device.

At operation 1004, the mute controller receives a mute setting signal. For example, the mute setting signal corresponds to the mute setting signal 520 of FIG. 5 and is received as a second input signal from an SoC of the computing device.

At operation 1006, the mute controller receives a light source voltage feedback signal. For example, the light source voltage feedback signal corresponds to the light source voltage feedback signal 540 of FIG. 5 and is received as a third input signal from a light source of the computing device.

At operation 1008, the mute controller receives a light source intensity signal. For example, the light source intensity signal corresponds to the light source intensity signal 530 of FIG. 5 and is received as fourth input signal from the SoC.

At operation 1010, the mute controller determines and stores mute state of the computing device. For example, and as described in connection with FIG. 5, the mute controller implements logic, in hardware and/or software, to generate output signals based on the input signals. The output signals reflect the determination of the mute state. Generally, the logic uses the mute button signal as a control to enter into the mute state and exit from the mute state back into a sensing state. The mute state can be stored as an indication (e.g., a flag), where one value of the indication indicates the mute state and another value indicates the sensing state. The logic uses also the light source voltage feedback signal to force the mute state upon detection of a failure in the light source. Once the mute state is entered, the SoC is prevented from changing the operational state back to the sensing state. In other words, the mute setting signal from the SoC is not usable to transition to the sensing state and only the mute button signal or the light source intensity signal (upon detection that the failure no longer exists) are usable for the transition to the sensing state.

At operation 1012, the mute controller outputs a light source intensity signal. For example, the light source intensity signal corresponds to the source setting signal 595 of FIG. 5, is a pass through of the fourth input signal, and is sent as a first output signal to the light source.

At operation 1014, the mute controller outputs a button selection signal. For example, the button selection signal corresponds to the button selection signal 570 of FIG. 5, is not delayed by a delay time interval, and is sent as a second output signal to the SoC.

At operation 1016, the mute controller outputs a mute status signal. For example, the mute status signal corresponds to the mute status signal 580 of FIG. 5, is delayed by the delay time interval relative to the button selection signal output at operation 514, and is sent as a third output signal to the SoC.

At operation 1018, the mute controller outputs a mute state signal. For example, the mute state signal corresponds to the mute state signal (A) 550 of FIG. 5, is also delayed by the delay time interval relative to the button selection signal output at operation 514, and is sent as a fourth output signal to a switch set coupled with a sensor of the computing device.

At operation 1020, the mute controller outputs a redundant mute state signal. For example, the redundant mute state signal corresponds to the mute state signal (b) 560 of FIG. 5, is also delayed by the delay time interval relative to the button selection signal output at operation 514, and is sent as a fifth output signal to the switch set.

Figure 11:
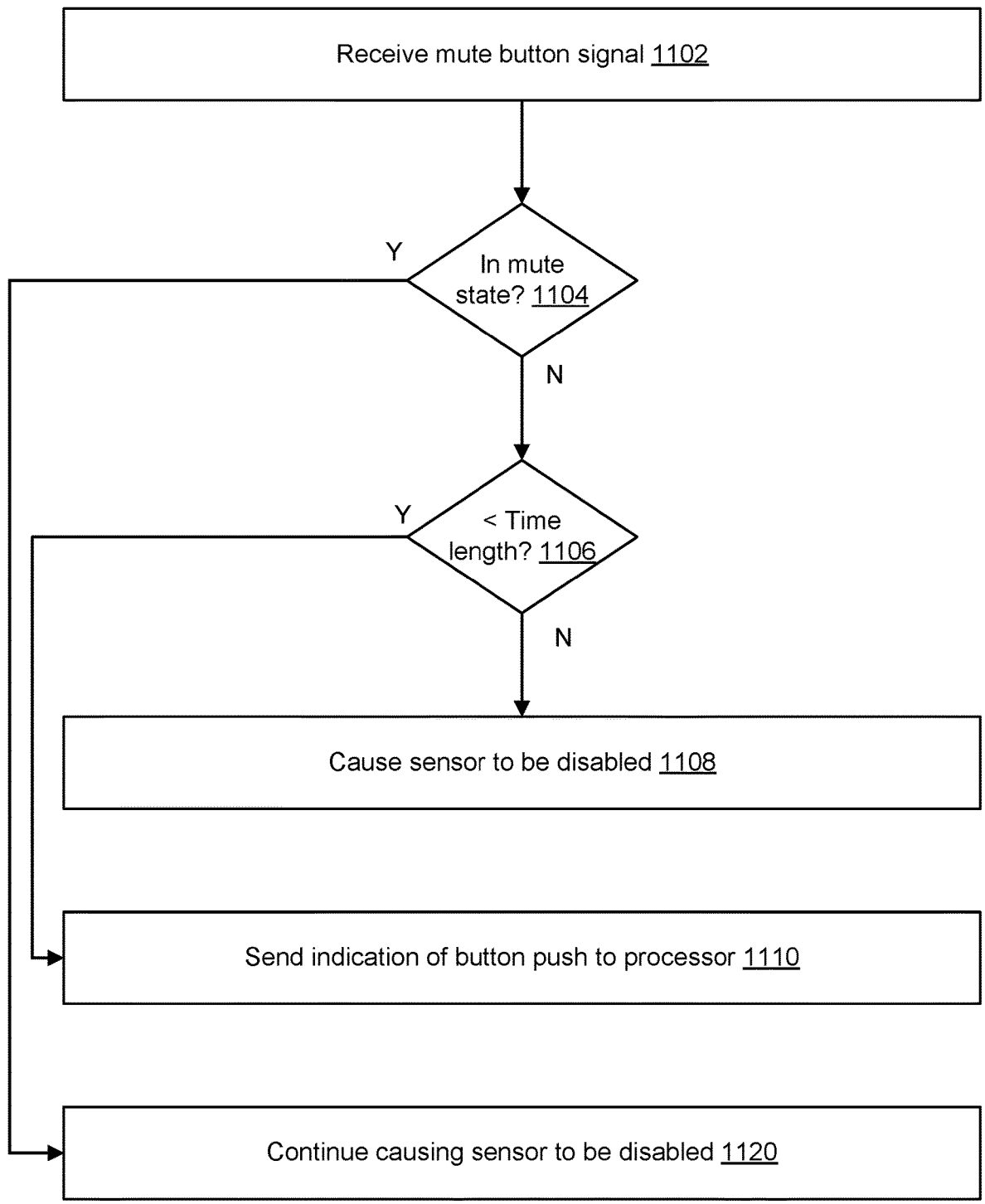
FIG. 11 illustrates an example of a flow for controlling a sensor based on a mute button signal, according to embodiments of the present disclosure.

FIG. 11 illustrates an example of a flow for controlling a sensor based on a mute button signal, according to embodiments of the present disclosure. In an example, the flow starts at operation 1102, where the mute controller receives a mute button signal. For instance, the mute button signal is received from a button of the computing device and includes button ON data indicating a push of the button, where the push corresponds to a request to disable the sensor (e.g., for the mute state).

At operation 1104, the mute controller determines whether the sensor is already in the mute state or not. For instance, the mute controller stores an indication of the state (e.g., as a flag). And the mute state is determined from the stored indication. In another illustration, the mute controller determines whether the mute controller is already outputting controls to disable the sensor (e.g., a mute state signal to a power switch and the same or a redundant mute signal to a data switch). If the sensor is already in the mute state, operation 1120 follows operation 1104. Otherwise, operation 1106 is performed.

At operation 1106, the mute controller determines whether a time duration of the push is smaller than a predefined time length. For instance, upon receiving the mute button signal, the mute controller starts a timer and, upon receiving a change to the mute button signal (e.g., this signal changes to include button OFF data), the mute controller stops the time. The time duration between the start and the stop is compared to the predefined time length. If smaller, operation 1110 follows operations 1106. Otherwise, operation 1108 is performed.

At operation 1108, the mute controller causes the sensor to be disabled. For instance, the mute controller sends first output data to a power switch that couples the sensor and the power source. The first output data causes the power switch to decouple the sensor from the power source. The mute controller also sends second output data to a data switch that couples the sensor and the SoC. The second output data causes the data switch to decouple the sensor from the SoC via. In addition, the mute controller sends, to the SoC, third output data indicating the push of the button and fourth output data indicating that the sensor is disabled, where the first, second, and fourth output data can be send after a time delay relative to the third output data. Further, the mute controller sends fifth output data to the light source, where the fifth output data includes light ON data indicating that the light source should emit light.

At operation 1110, the mute controller sends an indication of the push of the button to the SoC. In response, the SoC may output a message (e.g., via a speaker or a GUI) requesting a user confirmation to mute the sensor. If the confirmation is received, the SoC can output a mute setting signal to the mute controller requesting the sensor to be disabled.

At operation 1120, the sensor is already disabled and the mute controller continues causing the sensor to be disabled. For instance, the mute controller continues to send the five output data described at operation 1108 or does not send other output data that causes the sensor to be enabled.

Figure 12:
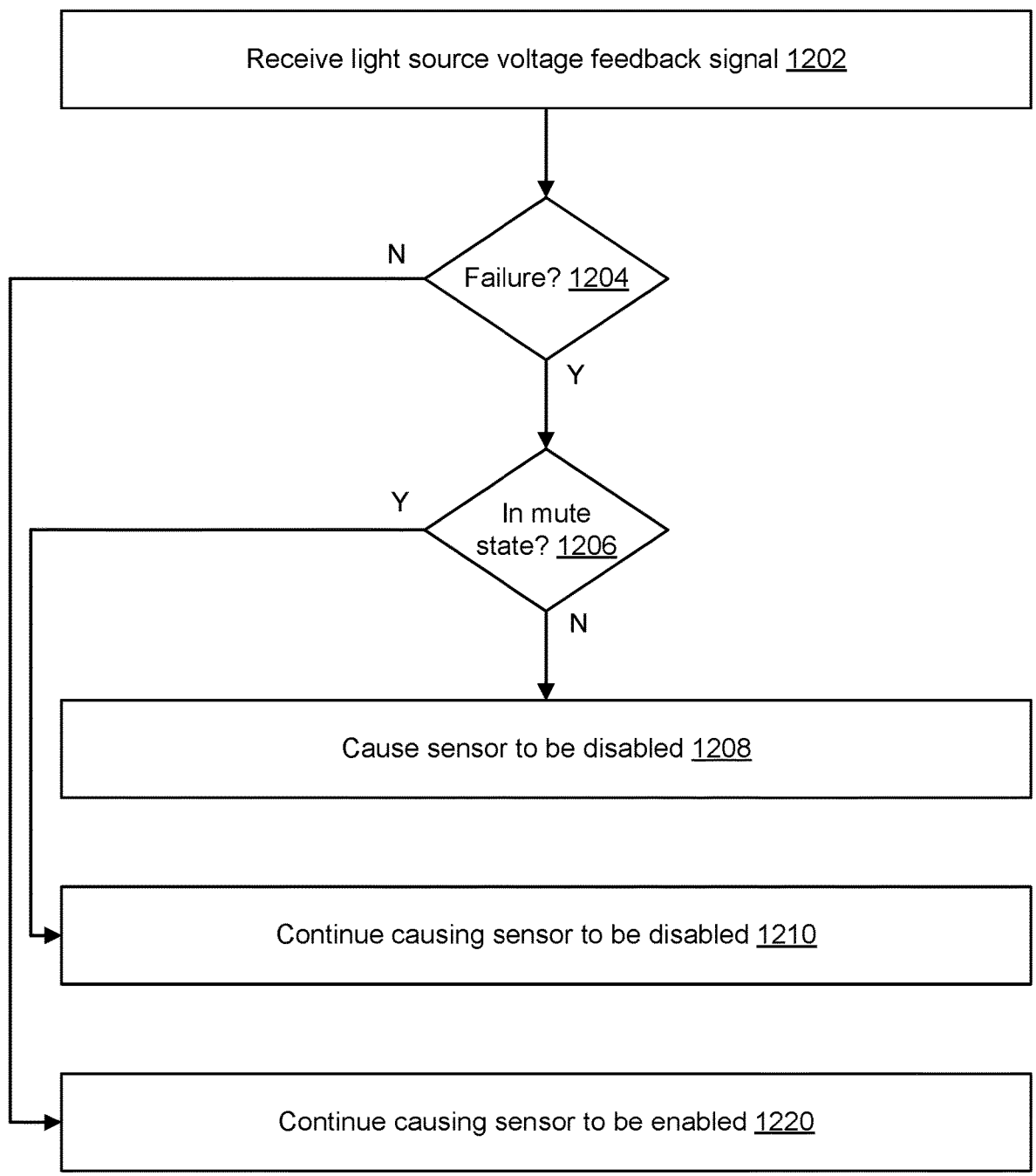
FIG. 12 illustrates an example of a flow for controlling a sensor based on a light source voltage feedback signal, according to embodiments of the present disclosure.

FIG. 12 illustrates an example of a flow for controlling a sensor based on a light source voltage feedback signal, according to embodiments of the present disclosure. Operations of the flow of FIG. 12 may be performed following the reception of input data indicating a request to enable the sensor and the enabling of the sensor based on this input data.

In an example, the flow starts at operation 1202, where the mute controller a light source voltage feedback signal from the light source. The light source voltage feedback signal indicates a voltage value at the light source.

At operation 1204, the mute controller determines whether a failure of the light source exists or not. The failure can correspond to the light source emitting light indicating the mute state, while the sensor is still enabled (e.g., following the disabling of the sensor per the flow of FIG. 11, the input data can be received requesting the enabling of the sensor, and the sensor is enabled accordingly. Thereafter, the failure of the light source may occur). The mute controller can compare the voltage value to a reference voltage that corresponds to the minimum voltage at which visible light emission can occur. If larger than the reference voltage, the failure is detected and operation 1206 follows operation 1204. Otherwise, operation 1220 is performed.

At operation 1206, the mute controller determines whether the sensor is already in the mute state or not. For instance, the mute controller stores an indication of the state (e.g., as a flag). And the mute state is determined from the stored indication. In another illustration, the mute controller determines whether the mute controller is already outputting controls to disable the sensor (e.g., a mute state signal to a power switch and the same or a redundant mute signal to a data switch). If the sensor is already in the mute state, operation 1210 follows operation 1206. Otherwise, operation 1208 is performed.

At operation 1208, the mute controller causes the sensor to be disabled. For instance, the mute controller sends the five output data described herein above in connection with operation 1108.

At operation 1210, the sensor is already disabled and the mute controller continues causing the sensor to be disabled. For instance, the mute controller continues to send the five output data described at operation r does not send other output data that causes the sensor to be enabled.

At operation 1220, the sensor is already enabled and the mute controller continues causing the sensor to be enabled. For instance, the mute controller does not change controls over the power switch, data switch, SoC, and light source.

Figure 13:
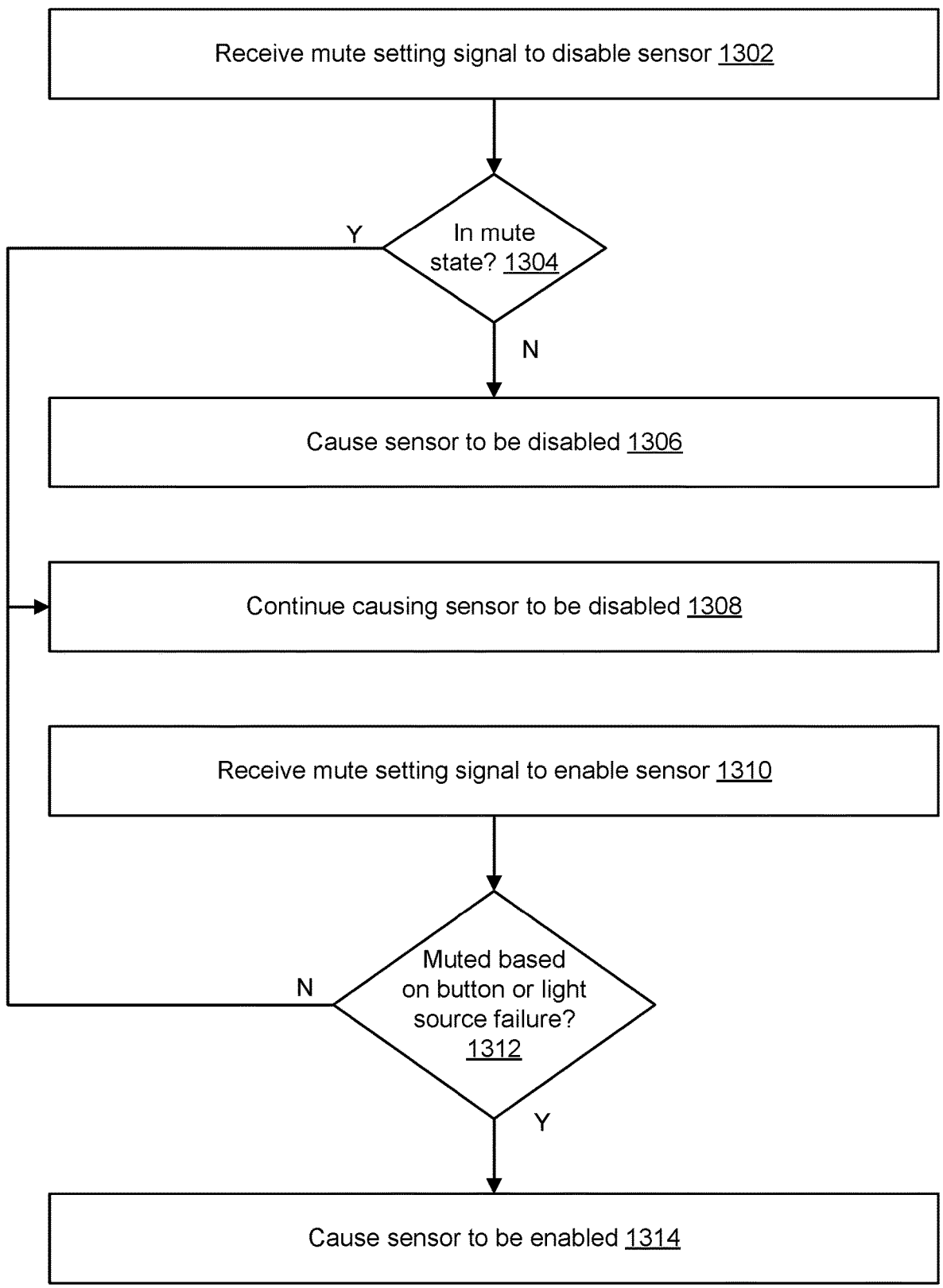
FIG. 13 illustrates an example of a flow for controlling a sensor based on a mute setting signal, according to embodiments of the present disclosure.

FIG. 13 illustrates an example of a flow for controlling a sensor based on a mute setting signal, according to embodiments of the present disclosure. In an example, the flow starts at operation 1302, where the mute controller receives a mute setting signal to disable the sensor. For instance, the mute setting signal is received as input data from the SoC and indicates a request to the disable the sensor.

At operation 1304, the mute controller determines whether the sensor is already in the mute state or not. For instance, the mute controller stores an indication of the state (e.g., as a flag). And the mute state is determined from the stored indication. In another illustration, the mute controller determines whether the mute controller is already outputting controls to disable the sensor (e.g., a mute state signal to a power switch and the same or a redundant mute signal to a data switch). If the sensor is already in the mute state, operation 1308 follows operation 1304. Otherwise, operation 1306 is performed.

At operation 1306, the mute controller causes the sensor to be disabled. For instance, the mute controller sends the five output data described herein above in connection with operation 1108.

At operation 1308, the sensor is already disabled and the mute controller continues causing the sensor to be disabled. For instance, the mute controller continues to send the five output data described or does not send other output data that causes the sensor to be enabled.

At operation 1310, the mute controller receives a mute setting signal to enable the sensor. For instance, the mute setting signal is received as input data from the SoC and indicates a request to the enable the sensor. In an example, the mute controller can ignore this input data and may not re-enable the sensor based on this input data. In another example, the mute controller may re-enable the sensor based on prioritizing other input data as further described in the remaining operations of the flow.

At operation 1312, the mute controller determines whether the sensor entered the mute state (e.g., is disabled) because of a mute button signal or a light source voltage feedback signal. If so, the mute controller may not enable the sensor in response to the request from the SoC and operation 1308 follows operation 1312. Otherwise, the sensor entered the mute state because of a previous disable request from the SoC and can be enabled. Accordingly, operation 1314 follows operation 1312. This determination can be based on the current values of mute button signal or a light source voltage feedback. For instance, if the mute button signal includes button ON data, enabling the sensor is prohibited. Similarly, if the light source voltage feedback signal is larger than the reference voltage, enabling the sensor is prohibited.

At operation 1314, the mute controller causes the sensor to be enabled. For instance, the mute controller sends first output data to the power switch to couple the sensor to the power source. The mute controller sends second output data to the data switch to couple the sensor to the SoC. The mute controller also sends third output data to the SoC indicating that the sensor is enabled and sends fourth output data to the light source to stop the light emission.

Figure 14:
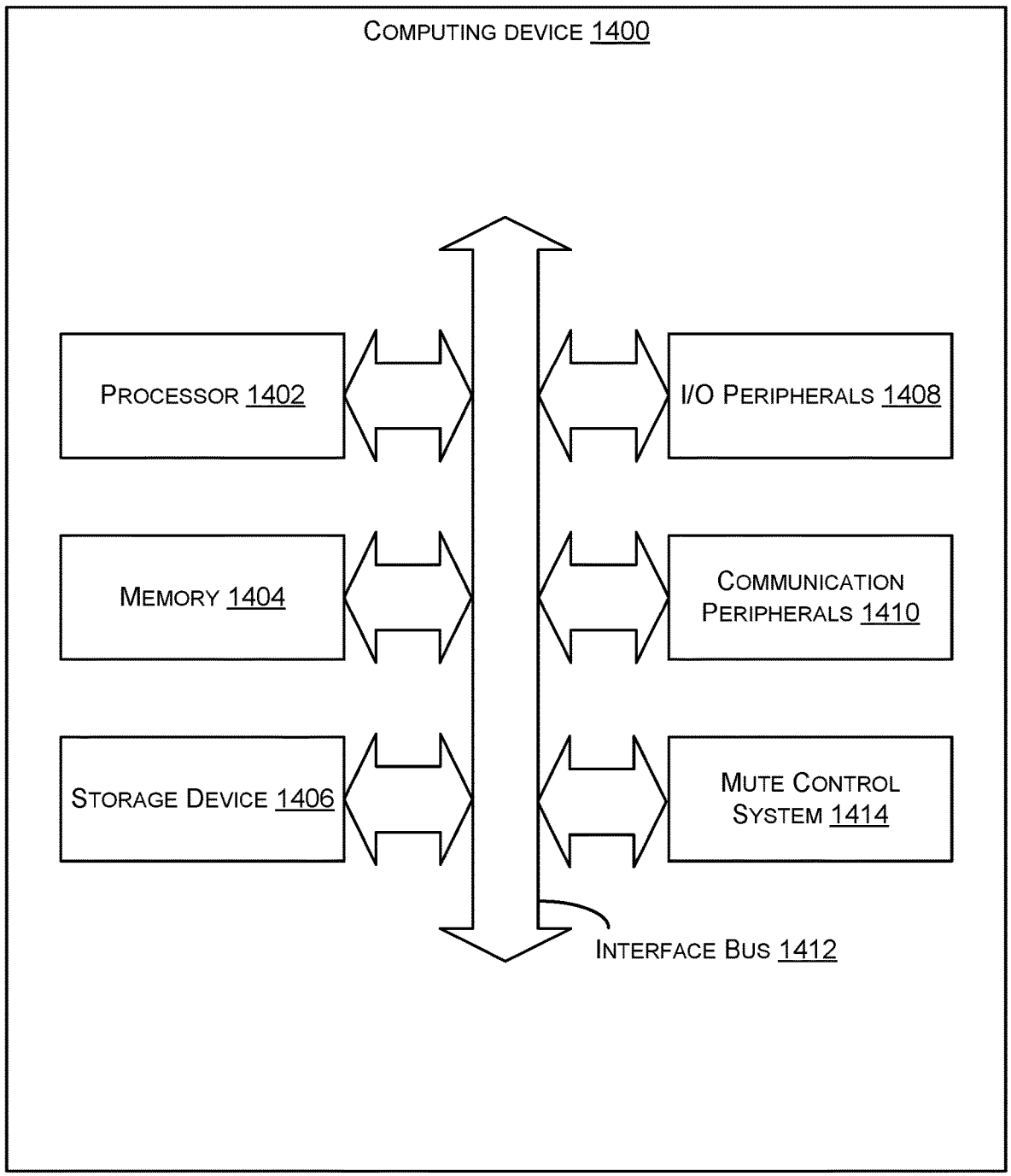
FIG. 14 illustrates an example of an architecture of a computing device that includes a mute control circuitry, according to embodiments of the present disclosure.

FIG. 14 illustrates an example of an architecture of a computing device 1400 that includes a mute control system 1414, according to embodiments of the present disclosure. The mute control c system 1414 can include a mute button, a mute controller, and one or more switch sets similar to the components of the computing devices described herein above. Although the components of the computing device 1400 are illustrated as belonging to a same computing device 1400, the computing device 1400 can also be distributed (e.g., between multiple user devices).

The computing device 1400 includes at least a processor 1402, a memory 1404, a storage device 1406, input/output peripherals (I/O) 1408, communication peripherals 1410, an interface bus 1412, and the mute controls system 1414. The interface bus 1412 is configured to communicate, transmit, and transfer data, controls, and commands among the various components of the computing device 1400. The memory 1404 and the storage device 1406 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1404 and the storage device 1406 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing device 1400.

Further, the memory 1404 includes an operating system, programs, and applications. The processor 1402 is configured to execute the stored instructions and includes, for example, a logical processing unit, a microprocessor, a digital signal processor, and other processors. The memory 1404 and/or the processor 1402 can be virtualized and can be hosted within another computing device of, for example, a cloud network or a data center. The I/O peripherals 1408 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1408 are connected to the processor 1402 through any of the ports coupled to the interface bus 1412. The communication peripherals 1410 are configured to facilitate communication between the computing device 1400 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A system, comprising:
   a button;
   a light source;
   a microphone;
   a processor;
   a first power switch coupled to a first power line between the microphone and a power source;
   a first data switch coupled to a first data line between the microphone and the processor; and
   a mute controller coupled with the button, the light source, the first power switch, and the first data switch, the mute controller configured to:
   receive first button ON data from the button, the first button ON data indicating a request to disable the microphone; and
   based on the first button ON data:
     send, to the first power switch, first mute state data, the first mute state data causing the microphone to be decoupled from the power source,
     send, to the first data switch, second mute state data, the second mute state data causing data bits on the first data line to have a zero value, and
     send, to the light source, light ON data, the light ON data causing light emission by the light source.

2. The system of claim 1, further comprising:
   a camera;
   a second power switch coupled to a second power line between the camera and the power source; and
   a second data switch coupled to a second data line between the camera and the processor, wherein the mute controller is further configured to:

send the first mute state data to the second power switch, the first mute state data causing the camera to be decoupled from the power source; and send the second mute state data to the second data switch, the second mute state data causing the second data switch to send a camera disabled status to the processor.

3. The system of claim 2, wherein the mute controller is further configured to:

send, to the processor, second button ON data indicating activation of the button, wherein the first mute state data and the second mute state data are sent after a time delay relative to the sending of the second button ON data; and send, to the processor and after the time delay, third mute state data indicating that the camera is disabled.

4. A method implemented by a controller, the method comprising:

receiving, by the controller, input data indicating a request to disable a sensor of a device; and based on the input data:
causing, by the controller, the sensor to be decoupled from a power source via a first switch;
causing, by the controller, the sensor to be decoupled from a data input terminal of a processor of the device via a second switch, the controller being separate from and coupled with the processor; and
causing, by the controller, outputting, by a user interface of the device, of an indication that the sensor is disabled.

5. The method of claim 4, wherein the input data is received based on activation of a physical button of the device, the method further comprising:

sending, to the processor, first output data, wherein the first output data indicates the activation of the physical button; and sending, to the processor, second output data, wherein the second output data indicates that the sensor is disabled, and wherein the second output data is sent after a time delay relative to the sending of the first output data.

6. The method of claim 5, wherein causing the sensor to be decoupled from the power source comprises sending third output data to the first switch, wherein the third output data causes the first switch to sever a connection between the sensor and the power source, and wherein the first output data is sent to the first switch after the time delay.

7. The method of claim 4, further comprising:
receiving second input data indicating a request to enable the sensor;
enabling the sensor based on the second input data;
receiving, from a light source of the device, an input signal, wherein the input signal indicates a voltage value at the light source; and
causing the sensor to be decoupled from the power source via the first switch based on the input signal.

8. The method of claim 4, further comprising:
receiving second input data indicating a request to enable the sensor;
enabling the sensor based on the second input data;
receiving an input signal indicating light emission by a light source of the user interface while the sensor is enabled; and
causing the sensor to be decoupled from the power source via the first switch based on the input signal.

9. The method of claim 4, wherein causing the sensor to be decoupled from the power source comprises sending first output data to the first switch, wherein causing the sensor to be decoupled from the processor comprises sending second output data to the second switch, and wherein the second output data is an invert of the first output data.

10. The method of claim 4, wherein the input data is received from a button of the device based on activation of the button, and further comprising:

sending, to the processor, output data indicating the activation, wherein decoupling of the sensor from the power source is caused after a time delay relative to the sending of the output data; and causing, after the time delay, a second sensor of the device to be decoupled from the power source.

11. The method of claim 4, further comprising:
receiving, from the processor, second input data indicating a light intensity of a light source of the user interface; and
sending, based on the sensor being disabled, output data to the user interface, wherein the output data indicates the light intensity.

12. A device comprising:
a controller configured to:
receive input data indicating a request to disable a sensor of a device; and
based on the input data:
cause the sensor to be decoupled from a power source via a first switch;
cause the sensor to be decoupled from a data input terminal of a processor of the device via a second switch, the controller being separate from and coupled with the processor; and
cause outputting, by a user interface of the device, of an indication of that the sensor is disabled.

13. The device of claim 12, wherein the sensor comprises a microphone, wherein causing the sensor to be decoupled from the power source comprises sending first output data to the first switch coupled with the microphone and the power source, wherein causing the sensor to be decoupled from the processor comprises sending second output data to the second switch coupled with the microphone and the processor, and wherein the second output data is an invert of the first output data.

14. The device of claim 13, wherein the controller is further configured to:
send the first output data to a third switch coupled with a camera of the device and the power source; and
send the second output data to a fourth switch coupled with the camera and the processor.

15. The device of claim 12, wherein the input data is received from a button of the device, and wherein the controller is further configured to:
send, to the processor, first output data, wherein the first output data indicates activation of the button; and
send, to another input terminal of the processor, second output data, wherein the second output data indicates that the sensor is disabled and is sent after a time delay relative to the sending of the first output data.

16. The device of claim 12, wherein the controller is further configured to:
receive, from the user interface, an input signal indicating a voltage value at a light source of the user interface;
determine a failure of the light source based on a comparison of the voltage value to a voltage reference;
send, to the first switch, output data that causes the first switch to sever a connection between the sensor and the power source.

17. The device of claim 12, wherein the controller is further configured to:

receive, from the user interface, an input signal indicating a voltage value at a light source of the user interface; and send, to another input terminal of the processor, output data indicating that the sensor is disabled, wherein the output data is sent based on either the input data indicating the request to disable the sensor or the input signal indicating light emission by the light source based on the voltage value.

18. The device of claim 12, wherein the input data is received based on activation of a button of the device, and wherein the controller is further configured to:

determine a time duration of the activation; and determine that the time duration is smaller than a predefined length of time, wherein decoupling of the sensor from the power source is based on the time duration being smaller than the predefined length of time.

19. The device of claim 12, wherein the controller is further configured to send, to the processor, output data indicating that the sensor is disabled.

20. The device of claim 12, wherein causing the sensor to be decoupled from the data input terminal of the processor of the device comprises causing override data to be sent instead of sensor data to the data input terminal via the second switch.

\* \* \* \* \*